(12) United States Patent
Yokota et al.

(10) Patent No.: US 10,696,589 B2
(45) Date of Patent: Jun. 30, 2020

(54) GLASS BONDING MATERIAL AND MULTILAYER GLASS

(71) Applicant: HITACHI METALS, LTD., Tokyo (JP)

(72) Inventors: Masayuki Yokota, Suita (JP); Ryoji Inoue, Suita (JP); Yoshiharu Tsuboi, Suita (JP); Masaharu Yamamoto, Suita (JP); Masaru Fujiyoshi, Yasugi (JP); Naruaki Tomita, Tokyo (JP); Kouji Kawahara, Tokyo (JP)

(73) Assignee: HITACHI METALS, LTD., Tokyo (JP)

(*) Notice: Subject to any disclaimer, the term of this patent is extended or adjusted under 35 U.S.C. 154(b) by 222 days.

(21) Appl. No.: 15/602,569

(22) Filed: May 23, 2017

(65) Prior Publication Data

US 2017/0283318 A1    Oct. 5, 2017

Related U.S. Application Data

(63) Continuation of application No. PCT/JP2015/083817, filed on Dec. 1, 2015.

(30) Foreign Application Priority Data

Dec. 2, 2014   (JP) .................................. 2014-244219

(51) Int. Cl.
*C22C 38/08* (2006.01)
*C22C 38/40* (2006.01)
(Continued)

(52) U.S. Cl.
CPC .............. *C03C 27/08* (2013.01); *B32B 15/04* (2013.01); *B32B 17/06* (2013.01); *B32B 17/061* (2013.01);
(Continued)

(58) Field of Classification Search
None
See application file for complete search history.

(56) References Cited

U.S. PATENT DOCUMENTS 4,286,743 A * 9/1981 Vasseur ................. C03C 27/046
                                                          228/124.1
4,605,533 A    8/1986 Kudoh et al.
(Continued)

FOREIGN PATENT DOCUMENTS

GB   2 068 117 A       8/1981
JP   S61-147848    *   7/1986
(Continued)

OTHER PUBLICATIONS

NEA, "Invar", http://www.nealloys.com/invar_invar.php, accessed Jun. 19, 2019.*
(Continued)

*Primary Examiner* — Xiaobei Wang

(74) *Attorney, Agent, or Firm* — Westerman, Hattori, Daniels & Adrian, LLP

(57) ABSTRACT

This glass bonding material (21) is made of a cladding material (1) in which at least a first layer (11) made of an Al-based alloy and configured to be bonded to glass and a second layer (12) made of an Fe—Ni based alloy having a thermal expansion coefficient from 30° C. to 400° C. of $11.5 \times 10^{-6}$ $(K^{-1})$ or less are bonded.

18 Claims, 6 Drawing Sheets

(51) Int. Cl.

| | | |
|---|---|---|
| *C22C 38/52* | (2006.01) | |
| *C22C 38/10* | (2006.01) | |
| *C03C 27/08* | (2006.01) | |
| *B32B 15/04* | (2006.01) | |
| *B32B 17/06* | (2006.01) | |
| *C03C 27/04* | (2006.01) | |
| *C22C 30/00* | (2006.01) | |
| *C22C 19/05* | (2006.01) | |
| *E06B 3/673* | (2006.01) | |

(52) U.S. Cl.
CPC .......... *C03C 27/042* (2013.01); *C22C 19/058* (2013.01); *C22C 30/00* (2013.01); *C22C 38/08* (2013.01); *C22C 38/105* (2013.01); *C22C 38/40* (2013.01); *C22C 38/52* (2013.01); *E06B 3/67334* (2013.01)

(56) References Cited

U.S. PATENT DOCUMENTS

| | | |
|---|---|---|
| 2012/0269996 A1 | 10/2012 | Jäger |
| 2014/0205774 A1 | 7/2014 | Caliaro et al. |
| 2015/0030789 A1 | 1/2015 | Matsumoto et al. |

FOREIGN PATENT DOCUMENTS

| | | |
|---|---|---|
| JP | 2002-12455 A | 1/2002 |
| JP | 2002-105599 A | 4/2002 |
| JP | 2011-84437 A | 4/2011 |
| JP | 2011-241114 A | 12/2011 |
| JP | 2013-514245 A | 4/2013 |
| JP | 2014-525888 A | 10/2014 |
| WO | 2012/108083 A1 | 8/2012 |
| WO | 2013/154193 A1 | 10/2013 |

OTHER PUBLICATIONS

High Temp Metals, "Invar 36 Technical Data", https://www.hightempmetals.com/techdata/hitempInvar36data.php, accessed Jun. 19, 2019.*
English translation of Yuki et al. (JP S61-147848).*
International Search Report dated Jan. 26, 2016, issued in counterpart International Application No. PCT/JP2015/083817 (2 pages).
Extended (Supplementary) European Search dated Jun. 21, 2018, issued in counterpart application No. 15865702.3. (7 pages).
Office Action dated Dec. 26, 2018, issued in counterpart KR application No. 10-2017-7014329, with English translation. (7 pages).
Office Action dated Jul. 22, 2019, issued in counterpart KR Application No. 10-2017-7014329, with English translation (6 pages).

* cited by examiner

FIRST EMBODIMENT

FIRST MODIFIED EXAMPLE OF FIRST EMBODIMENT

SECOND MODIFIED EXAMPLE OF FIRST EMBODIMENT

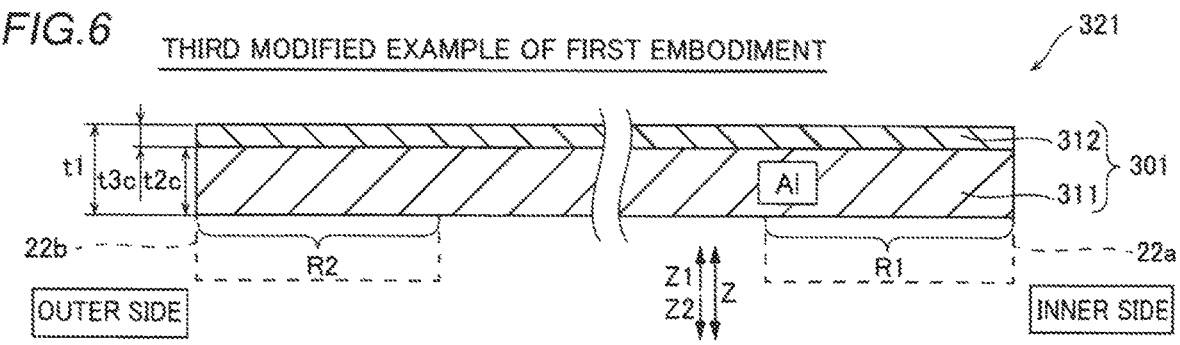
FIG.6 THIRD MODIFIED EXAMPLE OF FIRST EMBODIMENT
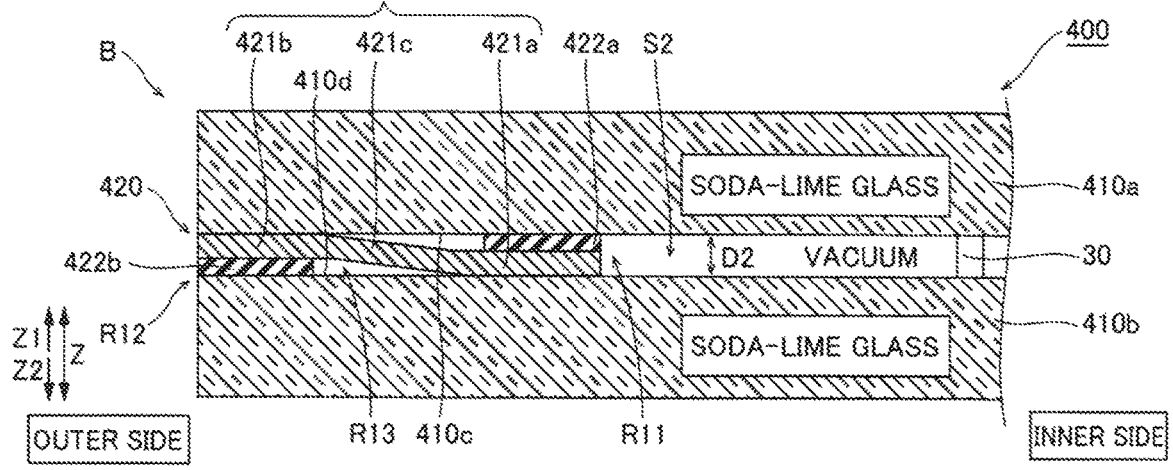
FIG.7 SECOND EMBODIMENT
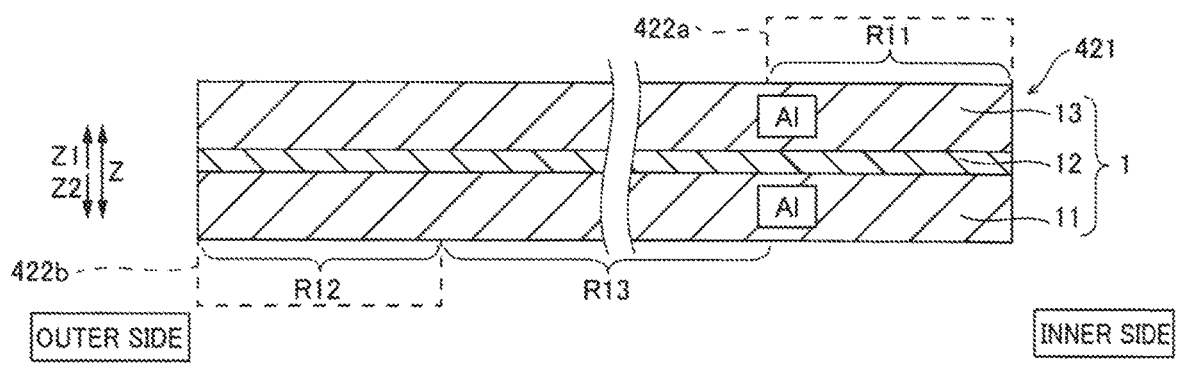
FIG.8

FIG.9 MODIFIED EXAMPLE OF SECOND EMBODIMENT
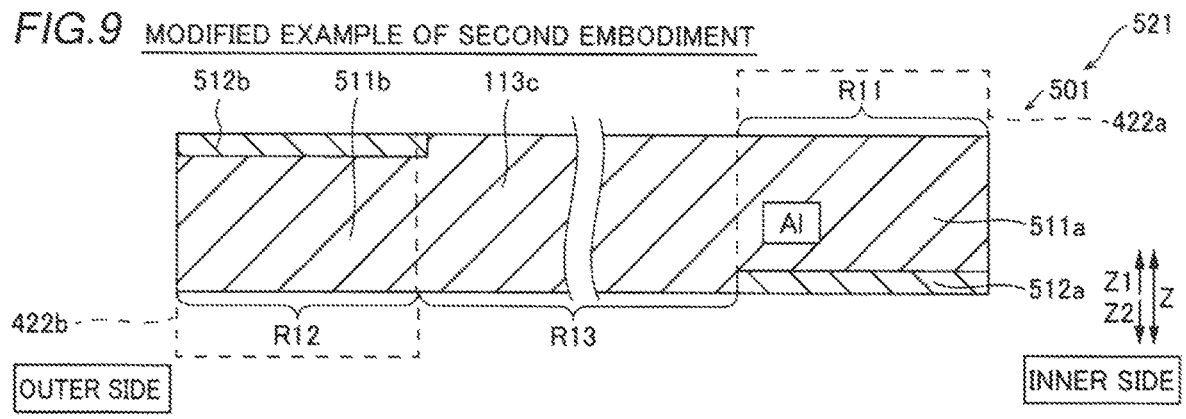
FIG.10
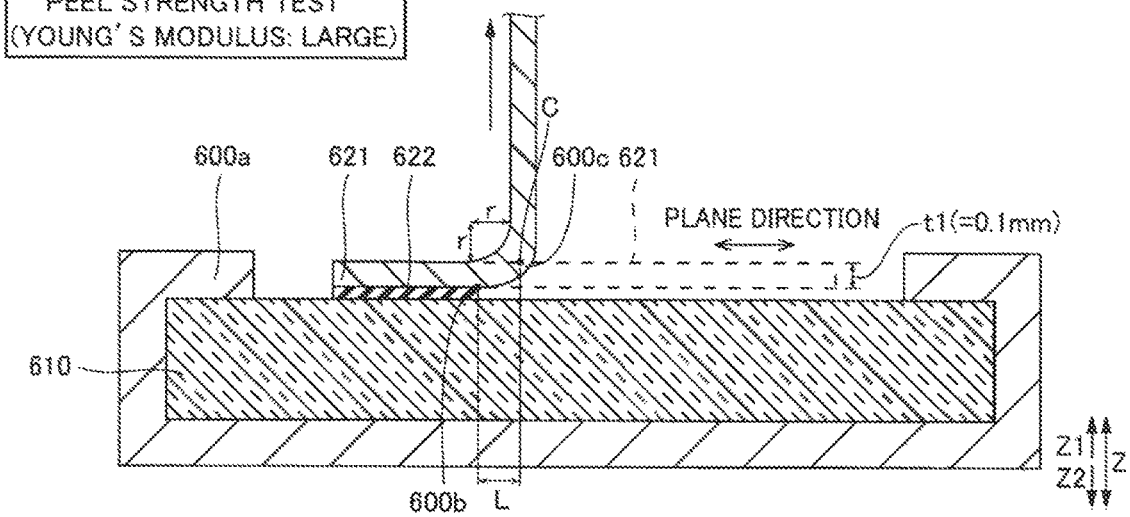
FIG.11
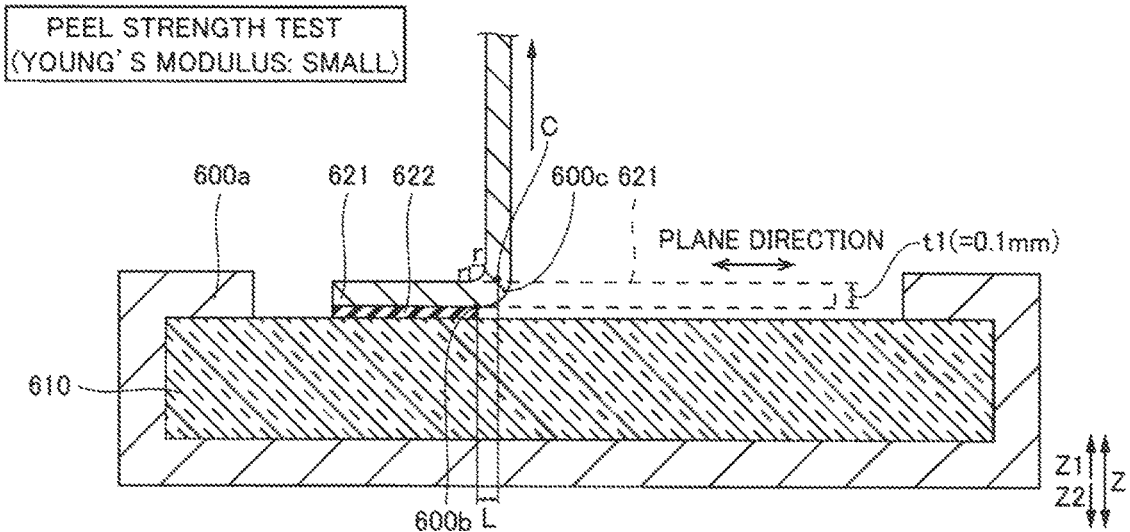

FIG.12

FIRST EXAMPLE (OTHER THAN CLADDING MATERIAL + REFERENCE)

| | MATERIAL COMPONENT (SINGLE PLATE) (mass%) | PROPERTY | | | |
|---|---|---|---|---|---|
| | | YOUNG'S MODULUS (GPa) | THERMAL EXPANSION COEFFICIENT 30℃~400℃ (×10⁻⁶/K) | CRACK | PEEL STRENGTH (N/mm) |
| REF. 1 | Bi BASED FRITTED GLASS | 100 | 8.0 | — | — |
| REF. 2 | SODA-LIME GLASS | 72 | 8.5 | — | — |
| COMP. EX. 1 | Al | 70 | 25.3 | × | 2.0 |
| COMP. EX. 2 | Fe-32Ni-8Co | 140 | 4.3 | × | 0.1 OR LESS |
| COMP. EX. 3 | Fe-42Ni | 147 | 5.8 | × | 0.1 OR LESS |
| COMP. EX. 4 | Fe-48Ni | 164 | 8.7 | ○ | 0.1 OR LESS |
| COMP. EX. 5 | Fe-48Ni-3Cr | 167 | 8.9 | ○ | 0.1 OR LESS |
| COMP. EX. 6 | Fe-25Cr-5Al | 158 | 12.2 | × | 0.1 OR LESS |

FIG.13

FIRST EXAMPLE (CLADDING MATERIAL OF THREE-LAYER STRUCTURE: Al/Fe-Ni BASED ALLOY/Al)

| | Fe-Ni BASED ALLOY (mass%) | | | THICKNESS RATIO (Al:Fe-Ni BASED ALLOY:Al) | PROPERTY | | | |
|---|---|---|---|---|---|---|---|---|
| | Ni | Co | Cr | | YOUNG'S MODULUS (GPa) | THERMAL EXPANSION COEFFICIENT 30℃~400℃ (×10⁻⁶/K) | CRACK | PEEL STRENGTH (N/mm) |
| EX. 1 | 36 | 0 | 0 | 1:3:1 | 126 | 8.4 | ○ | 0.1 OR LESS |
| EX. 2 | 36 | 0 | 0 | 3:1:3 | 85 | 9.1 | ○ | 2.0 |
| EX. 3 | 42 | 0 | 6 | 1:1:1 | 101 | 10.5 | ○ | 0.5 |
| EX. 4 | 42 | 0 | 6 | 2:1:2 | 97 | 10.8 | ○ | 1.2 |
| EX. 5 | 42 | 0 | 6 | 3:1:3 | 90 | 11.0 | ○ | 1.8 |
| EX. 6 | 30 | 16 | 6 | 3:1:3 | 88 | 9.6 | ○ | 2.0 |
| EX. 7 | 34 | 7.4 | 6 | 3:1:3 | 90 | 10.8 | ○ | 1.9 |
| EX. 8 | 40 | 7.4 | 6 | 3:1:3 | 90 | 10.4 | ○ | 2.0 |

(THE BALANCE OF Fe-Ni BASED ALLOY BEING Fe AND INEVITABLE IMPURITY ELEMENTS)

FIG.14

SECOND EXAMPLE (CLAD MATERIAL OF TWO-LAYER STRUCTURE: Al/Fe-30Ni-16Co-6Cr ALLOY)

|  | THICKNESS RATIO (Al:Fe-Ni BASED ALLOY) | PEEL STRENGTH (N/mm) |
|---|---|---|
| COMPARATIVE EXAMPLE 1a | (Al SINGLE PLATE) | 1.8 |
| EXAMPLE 11 | 1:1 | 0.9 |
| EXAMPLE 12 | 3:1 | 1.9 |
| EXAMPLE 13 | 6:1 | 2.7 |

(REFERENCE: THERMAL EXPANSION COEFFICIENT FROM 30° C TO 400° C OF Fe-30Ni-16Co-6Cr alloy=8.4×10-6/K)

FIG.15

THIRD EXAMPLE (Al-BASED ALLOY/Fe-30Ni-16Co-6Cr ALLOY, THICKNESS RATIO (Al-BASED ALLOY: Fe-Ni BASED ALLOY)=6:1)

|  | Al BASED ALLOY | PEEL STRENGTH (N/mm) |
|---|---|---|
| EXAMPLE 21 | HIGH PURITY Al | 3.0 |
| EXAMPLE 22 | A1050 | 2.7 |
| EXAMPLE 23 | A5052 | 0.1 OR LESS |
| EXAMPLE 24 | (A4047) | 1.6 |

FIG.16

REFERENCE EXAMPLE (CORROSION RESISTANCE TEST)

|  | MATERIAL COMPONENT (SINGLE PLATE) (mass%) | RUST SITUATION | | |
|---|---|---|---|---|
|  |  | 12h | 24h | 48h |
| COMP. EX. 1b | Al(A1050) | ○ | ○ | △ |
| REF. EX. 1 | Fe-48Ni | △ | × | × |
| REF. EX. 2 | Fe-48Ni-2Cr | △ | × | × |
| REF. EX. 3 | Fe-48Ni-4Cr | ○ | △ | × |
| REF. EX. 4 | Fe-48Ni-6Cr | ○ | ○ | △ |
| REF. EX. 5 | Fe-30Ni-16Co | △ | × | × |
| REF. EX. 6 | Fe-30Ni-16Co-2Cr | △ | × | × |
| REF. EX. 7 | Fe-30Ni-16Co-4Cr | ○ | △ | × |
| REF. EX. 8 | Fe-30Ni-16Co-6Cr | ○ | ○ | △ |

GLASS BONDING MATERIAL AND MULTILAYER GLASS

CROSS-REFERENCE TO RELATED APPLICATIONS

This application is a continuation of PCT/JP2015/083817, Glass Bonding Material and Multilayer Glass, Dec. 1, 2015, Masayuki YOKOTA, Ryoji INOUE, Yoshiharu TSUBOI, Masaharu YAMAMOTO, Masaru FUJIYOSHI, Naruaki TOMITA and Kouji KAWAHARA.

BACKGROUND OF THE INVENTION

Field of the Invention

The present invention relates to a glass bonding material and a multilayer glass using the glass bonding material.

Description of the Background Art

Conventionally, a multilayer glass in which a plurality of glass plates are bonded with a gap therebetween is known. Such a multilayer glass is disclosed, for example, in Japanese Patent Laying-Open No. 2002-12455.

In Japanese Patent Laying-Open No. 2002-12455, a multilayer glass is disclosed, in which two glass plates are opposedly arranged with a predetermined gap therebetween and the entire circumference of the peripheral edge part (sealing part) of the two glass plates are bonded by glass frit (fritted glass). In the multilayer glass described in Japanese Patent Laying-Open No. 2002-12455, it is configured such that an exhaust port for setting the gap to a low pressure space is formed and a glass plate surrounding the exhaust port and a round plate made of an Al plate, a 426 alloy (Fe-42Ni-6Cr alloy) plate material, or a 50 alloy (Fe-50Ni alloy) plate material are bonded together via fritted glass to seal the exhaust port.

However, in the multilayer glass described in Japanese Patent Laying-Open No. 2002-12455, in cases where the heat insulation property of the multilayer glass is improved by increasing the degree of vacuum of the gap (further lowering the pressure), a large temperature difference occurs between one surface side and the other surface side of the multilayer glass. As a result, it is considered that the degree of thermal expansion between a glass plate on one surface side and a glass plate on the other surface side greatly differs. For this reason, due to the fact that a large thermal stress due to the large thermal expansion difference between the two glass plates is applied to the fritted glass arranged at the outer peripheral portion, there is a problem that cracks, breakages, etc., may occur in the fritted glass.

SUMMARY OF THE INVENTION

In view of this, it has been considered to reinforce the sealing part by arranging a deformable metal member at the sealing part of the outer peripheral edge portion to absorb the generated stress. The inventors of the present invention considered to use an Al plate arranged at the exhaust port as described in Japanese Patent Laying-Open No. 2002-12455, or a low expansion plate material having a small thermal expansion difference with glass, which are thought to be high in adhesion to glass, as a metal member to be integrated in the sealing edge part (sealing part), that is, as a reinforcing member. However, the present inventors have found a problem that when an Al plate and fritted glass are bonded, a large thermal expansion difference occurs between the Al plate and the fritted glass or the soda-lime glass plate due to the large thermal expansion coefficient of the Al plate, which may cause cracks, breakages, etc., in the fritted glass due to the large thermal stress due to the thermal expansion difference. Therefore, in cases where fritted glass and an Al plate are bonded over the entire circumference of the outer peripheral edge portion in order to reinforce fritted glass arranged over the entire periphery of the outer peripheral edge portion, it is considered that cracks, breakages, etc., are more likely to occur in the fritted glass since a large thermal stress caused by a thermal expansion difference is applied over a wide range due to the arrangement of the Al plate in a wide range.

In addition, the present inventors found the fact that when a low expansion plate material such as an Fe-42Ni-6Cr alloy plate material or an Fe-50Ni alloy plate material and fritted glass are bonded, the peeling strength (peel strength) between the fritted glass and the low expansion plate material is small, causing a problem that the low expansion plate material is likely to be peeled off from the fritted glass. For this reason, incases where fritted glass and a low expansion plate material are bonded over the entire periphery of the outer peripheral edge part for reinforcing the fritted glass arranged over the entire circumference of the outer peripheral edge part, it is considered that two glass plates cannot be bonded sufficiently because the low expansion plate material is likely to be peeled off from the fritted glass.

The present invention was made to solve the aforementioned problems, and one object of the present invention is to provide a glass bonding material having a configuration capable of suppressing peeling of a glass bonding material from glass while suppressing the occurrence of cracks, breakages, etc., in the glass due to the glass bonding material regardless of types of glass to be bonded, and also to provide a multilayer glass using the glass bonding material.

As a result of earnest investigations to solve the aforementioned problems, the inventors of this application have found that the aforementioned problems can be solved by the following configuration. That is, the glass bonding material according to the first aspect of the present invention is made of a cladding material in which at least a first layer made of an Al-based alloy and configured to be bonded to glass and a second layer made of an Fe—Ni based alloy having a thermal expansion coefficient from 30° C. to 400° C. of $11.5 \times 10^{-6}$ $(K^{-1})$ or less are bonded. Note that the "Al-based alloy" includes not only an Al alloy but also pure Al of A1000 series. Also note that the "Fe—Ni based alloy" includes not only an Fe—Ni alloy but also an alloy containing an element other than Fe and Ni, such as an Fe—Ni—Co alloy, an Fe—Ni—Cr alloy, and an Fe—Ni—Co—Cr alloy.

The glass bonding material according to the first aspect of the present invention is, as described above, formed by a cladding material having a second layer made of an Fe—Ni based alloy having a thermal expansion coefficient from 30° C. to 400° C. of $11.5 \times 10^{-6}$ $(K^{-1})$ or less. Therefore, the thermal expansion of the first layer made of an Al-based alloy is suppressed by the second layer made of an Fe—Ni based alloy having a thermal expansion coefficient from 30° C. to 400° C. of $11.5 \times 10^{-6}$ $(K^{-1})$ or less, which is generally lower in expansion than an Al-based alloy. This makes it possible to lower the thermal expansion coefficient of the entire glass bonding material, which in turn can suppress the occurrence of cracks, breakages, etc., in the glass. Further, since the glass bonding material is formed by a cladding material including a first layer made of an Al-based alloy and configured to be bonded to glass, the separation of the glass bonding material from the glass can be suppressed. Note that the effects have been confirmed by experiments. As a result, it is possible to suppress peeling of the glass bonding material from the glass while suppressing the occurrence of cracks, breakages, etc., in the glass. Further, in the cladding material in which at least a first layer made of an Al-based alloy and configured to be bonded to glass and a second layer made of an Fe—Ni based alloy are bonded, since atomic diffusion, compound formation, etc., occur in the region where the metal layers (first layer and second layer) are bonded to each other, the bonding between the first layer and the second layer becomes stronger as compared with the case of bonding the first layer and the second layer by simple adhesion, etc. Therefore, in the glass bonding material made of the cladding material described above, since the first layer and the second layer are not easily peeled off, even when the inside of the multilayer glass (gap between the glass plates) is lowered in pressure into high vacuum, the sealing property at the bonded portion of the first layer and the second layer is not impaired, resulting in a glass bonding material suitable for maintaining the sealing.

In the glass bonding material according to the first aspect, it is preferable that the Young's modulus of the cladding material be 110 GPa or less. With such a configuration, it becomes possible to make the glass bonding material made of the cladding material elastically deformable. Here, the distance (distance L shown in FIG. 10) in the direction parallel to the bonding surface between the peeling starting point (the bonded end portion 600b shown in FIG. 10) when the glass bonding material starts to detach from the glass and the portion of the glass bonding material (the bent deformed portion 600c shown in FIG. 10) to which a vertical load shown by an arrow in FIG. 10 is applied becomes shorter by the elastically deformed amount of the glass bonding material. That is, the distance L shown in FIG. 11 when the Young's modulus of the cladding material is small becomes shorter than the distance L shown in FIG. 10 when the Young's modulus of the cladding material is large in a direction parallel to the bonding surface, and therefore the stress applied to the peeling starting point can be reduced. This is based on the finding of a new phenomenon that when the adhesive property indicating the substantial bonding property is the same degree, the material smaller in Young's modulus gives a higher strength in measuring the bonding strength (peel strength) in a peel mode (a mode in which the glass bonding material is peeled off from the glass bonded to the glass bonding material starting from the bonded end portion of a bonded surface as the peeling starting point) as one method of evaluating the bonding strength between glass and a glass bonding material. As a result, possible peeling of the glass bonding material from the glass can be effectively suppressed.

In the glass bonding material according to the first aspect, it is preferable that the first layer be bonded to soda-lime glass via fritted glass as glass and a thermal expansion $X \times 10^{-6}$ ($K^{-1}$) from 30° C. to 400° C. of the cladding material satisfies a relationship of 7.5×11.5. With this configuration, the glass bonding material made of the cladding material becomes to have a thermal expansion close to the thermal expansion coefficient ($8.5 \times 10^{-6}$ ($K^{-1}$)) from 30° C. to 400° C. of soda-lime glass or fritted glass, which makes it possible to suppress the occurrence of cracks, breakages, etc., in the fritted glass between the soda-lime glass or soda-lime glass and the glass bonding material.

When heat-bonding the glass bonding material and the soda-lime glass via the fritted glass, they are heated to a predetermined temperature and then cooled. During the cooling process or after the cooling process, in cases where the thermal expansion coefficient of the cladding material is larger than the thermal expansion coefficient of the soda-lime glass, a force acts on the soda-lime glass in the compression direction due to the thermal expansion difference between the glass bonding material made of the cladding material and the soda-lime glass. On the other hand, in cases where the thermal expansion coefficient of the cladding material is smaller than the thermal expansion coefficient of the soda-lime glass, a force acts on the soda-lime glass in the pulling direction. Note that glass has properties that it is strong in the compression direction, which hardly causes cracks or breakages, while it is weak in the tensile direction, which likely causes cracks or breakages. In the present invention, focusing on the properties of glass, by setting the acceptable range of the thermal expansion coefficient $X \times 10^{-6}$ ($K^{-1}$) of the cladding material in a range smaller than the thermal expansion coefficient from 30° C. to 400° C. ($8.5 \times 10^{-6}$ ($K^{-1}$)) of soda-lime glass to a range equal to or lager than $7.5 \times 10^{-6}$ ($K^{-1}$), it is possible to suppress the occurrence of cracks, breakages, etc., in the glass (especially, in the fritted glass) even when a force in the tensile direction which readily causes cracks or breakages is applied. Further, by widely setting the acceptable range of the thermal expansion coefficient $X \times 10^{-6}$ ($K^{-1}$) of the cladding material in the range larger than the thermal expansion coefficient of soda-lime glass to a range equal to or less than $11.5 \times 10^{-6}$ ($K^{-1}$), it is possible to sufficiently suppress the occurrence of cracks, breakages, etc., in the glass (especially, in the fritted glass). Therefore, by selecting a cladding material, it is possible to obtain a glass bonding material capable of coping with a type of glass to be bonded.

In the glass bonding material according to the aforementioned first aspect, it is preferable that a Young's modulus of the first layer made of an Al-based alloy be smaller than a Young's modulus of the second layer made of an Fe—Ni based alloy and that a thickness of the first layer be equal to or larger than a thickness of the second layer. With this configuration, the thickness of the first layer small in Young's modulus can be secured sufficiently, which enables to make the glass bonding material made of the cladding material elastically deformable. As a result, the peel strength of the glass bonding material can be improved. As a result, peeling of the glass bonding material from the glass can be more suppressed.

In the glass bonding material according to the aforementioned first aspect, it is preferable that the second layer made of an Fe—Ni based alloy be arranged at a position opposed to a region where the first layer and the glass are bonded in a thickness direction of the cladding material. That is, in the thickness direction of the cladding material, the second layer, which is generally made of an Fe—Ni based alloy having a lower expansion than that of an Al-based alloy, is arranged at a position opposed to the region where the first layer and the glass are bonded. Therefore, it is possible to more assuredly suppress the thermal expansion of the first layer made of an Al-based alloy. With this, even in cases where the first layer made of an Al-based alloy having a large thermal expansion is bonded to a glass member, it is possible to more effectively suppress the occurrence of cracks, breakages, etc., in the glass. Further, in this configuration, by configuring the cladding material such that a second layer is provided with respect to the first layer like an overly clad type cladding material, the production of the cladding material can be made more easily.

In the glass bonding material according to the first aspect, it is preferable that the cladding material be an overlay type cladding material of a three-layer structure in which the first layer, the second layer, and a third layer are bonded, the third layer being made of an Al-based alloy and bonded to a surface of the second layer opposite to a surface to which the first layer is bonded. With this structure, since the first layer and the third layer made of Al-based alloys of the same kind are arranged on both surfaces of the second layer, it is possible to suppress the occurrence of warpage in the cladding material due to the fact that the one surface side of the cladding material deforms (extends) larger than the other surface side at the time of producing the cladding material. Further, the cladding material is made of an overlay type cladding material in which the first layer, the second layer and the third layer are arranged over the entire surface. Therefore, the cladding material can be easily formed as compared with the inlay type or edge lay type cladding material in which a layer structure is formed only on a part of the cladding material. As a result, the glass bonding material can be efficiently produced by using an overlay type cladding material of a three-layer structure as the glass bonding material.

In this case, it is preferable that the first layer and the third layer have approximately the same thickness. With this structure, since the first layer and the third layer not only are made of Al-based alloys of the same type but also have approximately the same thickness, the warp of the cladding material can be suppressed. At the same time, since it is not necessary to strictly distinguish between the front and back of the glass bonding member made of the cladding material, handling of the glass bonding member can be made easier.

In the glass bonding material according to the first aspect, it is preferable that the Fe—Ni based alloy constituting the second layer be made of 28 mass % or more and 50 mass % or less of Ni, 0 mass % or more and 20 mass % or less of Co, 0 mass % or more and 8 mass % or less of Cr, the balance being Fe and inevitable impurity elements. Note that containing 0 mass % or more of Co or Cr means that Co and Cr are arbitrary metallic elements and do not need to be contained in the Fe—Ni based alloy. With such a structure, since the Fe—Ni based alloy constituting the second layer contains at least 28 mass % or more and 50 mass % or less of Ni, the second layer can be assuredly made to a lower expansion. Further, when the Fe—Ni based alloy contains Co, since the Curie point (transition point in the thermal expansion curve) of the Fe—Ni based alloy can be increased depending on its content, the thermal expansion coefficient of the second layer and the cladding material can be kept small. Further, the Co content in the Fe—Ni based alloy is more preferably 20 mass % or less, which can suppress the used amount of expensive Co. Furthermore, when the Fe—Ni based alloy contains Cr, the corrosion resistance of the second layer can be improved depending on the content. Further, since the Fe—Ni based alloy contains 8 mass % or less of Cr, it is possible to suppress the increase of the thermal expansion coefficient of the Fe—Ni based alloy while improving the corrosion resistance of the second layer.

In this case, it is preferable that the Fe—Ni based alloy constituting the second layer contain 4 mass % or more and 8 mass % or less of Cr. With this structure, since the Fe—Ni based alloy contains 4 mass % or more of Cr, the corrosion resistance of the Fe—Ni based alloy can be assuredly improved.

In the glass bonding material according to the first aspect, it is preferable that the Al-based alloy constituting the first layer contain 99.0 mass % or more of Al. With this structure, since impurity elements (for example, Mg, Si, etc.) other than Al contained in the Al-based alloy can be reduced, the bonding of the Al-based alloy constituting the first layer and the glass can be further improved. Note that the effects have also been confirmed by experiments.

In the glass bonding material according to the first aspect, it is preferable that the glass bonding material be used for a sealing part of a vacuum multilayer glass. By using the glass bonding material of the present invention for a sealing part of a vacuum multilayer glass, peeling of the glass bonding material from the glass can be suppressed while suppressing the occurrence of cracks, breakages, etc., in the glass to be arranged in the sealing part of the vacuum multilayer glass where large thermal stress is likely to be applied due to a large temperature difference between the one surface side and the other surface side of the vacuum multilayer glass having a high heat insulating property. For this reason, using the glass bonding material according to the present invention for a sealing part of a vacuum multilayer glass is extremely effective.

In the configuration that the Young's modulus of the aforementioned cladding material is 110 GPa or less, it is preferable that the Young's modulus of the cladding material be 85 GPa or more and 100 GPa or less. With this configuration, it is possible to more effectively suppress peeling of the glass bonding material from the glass while maintaining the rigidity of the cladding material.

In the configuration in which the thickness of the aforementioned first layer is equal to or greater than the thickness of the second layer, it is preferable that the thickness of the first layer be twice or more the thickness of the second layer. With this configuration, the thickness of the first layer small in Young's modulus can be secured sufficiently. As a result, the peel strength of the glass bonding material can be further improved.

In the glass bonding material according to the first aspect, it is preferable that the second layer be not arranged at a position opposed to a region where the first layer and the glass are not bonded but be arranged at a position opposed to a region where the first layer and the glass are bonded. With this configuration, it is possible to reduce the used amount of the Fe—Ni based alloy constituting the second layer while arranging the second layer at a position opposed to a region where the first layer and the glass are bonded and assuredly suppressing the thermal expansion of the first layer in the region where the first layer and the glass are bonded.

In the glass bonding material according to the first aspect, it is preferable that the Young's modulus of the first layer made of an Al-based alloy be smaller than the Young's modulus of the second layer made of an Fe—Ni based alloy and that the first layer be arranged on both the region where the first layer and the glass are bonded and the region where the first layer and the glass are not bonded. With this configuration, while securing the bonding between the glass bonding material and the glass in the region where the first layer and the glass are bonded, it is possible to suppress the occurrence of cracks, breakages, etc., in the glass by reducing the stress applied to the glass in the region where the first layer small in Young's modulus and the glass are not bonded.

In the glass bonding material according to the first aspect, it is preferable that the second layer be arranged on a surface opposite to the region where the first layer and the glass are bonded at a position opposed to a region where the first layer and the glass are bonded. With this configuration, the cladding material can be easily produced as compared with the case in which the second layer is arranged so as not to be exposed on the surface of the glass bonding material.

In the glass bonding material according to the first aspect, it is preferable that the cladding material include a pair of parallel parts provided in regions where the first layer and the glass are bonded and extending approximately parallel to a bonding surface of a member to which the glass is bonded, and an inclined portion extending in an inclined state with respect to the bonding surface so as to connect the pair of parallel parts. With such a configuration, it is possible to easily form a gap between the members by separating the members with the inclined portion while favorably securing the bonding between the glass bonding material and the member to which the glass is bonded by the pair of parallel parts. With this, for example, in using the glass bonding material for a vacuum multilayer glass, it is possible to easily form a gap in the vacuum multilayer glass and vacuum the gap.

Further, by applying the glass bonding material to a vacuum multilayer glass, a vacuum multilayer glass having the following structure can be provided. That is, a vacuum multilayer glass can be provided in which it is a vacuum multilayer glass in which a gap is formed between two glass plates facing each other, the gap is hermetically sealed by sealing the peripheral region of the two glass plates by the sealing part made of the glass bonding material and the fritted glass, in the peripheral region, as viewed from the thickness direction of the vacuum multilayer glass, the glass bonding material annularly formed along the periphery of the vacuum multilayer glass is arranged, the peripheral region includes a region to be bonded to a first glass formed around one of the glass plates and a region to be bonded to a second glass formed around the other glass plate, and in the region to be bonded to the first glass and the region to be bonded to the second glass, both the sealing part and the glass plate are bonded so that the gap is sealed.

The multilayer glass according to the second aspect of the present invention is a multilayer glass formed by arranging a plurality of glass plates with a gap therebetween and bonding a plurality of glass plates by a sealing part, and the sealing part includes a glass bonding material made of a cladding material in which at least a first layer made of an Al-based alloy and configured to be bonded to glass and a second layer made of an Fe—Ni based alloy having a thermal expansion coefficient from 30° C. to 400° C. of $11.5 \times 10^{-6}$ $(K^{-1})$ or less are bonded. With this structure, using the glass bonding material capable of suppressing peeling from the glass while suppressing the occurrence of cracks, breakages, etc., in the fritted glass, a multilayer glass in which a plurality of glass plates are bonded together with the gap therebetween can be obtained.

In the multilayer glass according to the second aspect, it is preferable that the sealing part be formed by bonding the fritted glass and the glass bonding material. With this structure, it is possible to suppress peeling of the glass bonding material from the fritted glass while suppressing the occurrence of cracks, breakages, etc., in the fritted glass. Further, when bonding a plurality of glass plates and the fritted glass of the sealing part, since the fritted glass melts at a low temperature, it is possible to easily form the bonding between the glasses and suppress peeling of the sealing part and the glass plate.

In the multilayer glass according to the second aspect, it is preferable that the gap be lowered in pressure. With this structure, in the multilayer glass in which peeling of the glass bonding material from the glass is suppressed, it is possible to reduce the thermal conductivity in the gap between the glass plates, and therefore it is possible to improve the heat insulating performance.

According to the present invention, as described above, it is possible to provide a glass bonding material having a configuration capable of suppressing occurrence of peeling of the glass bonding material from glass while suppressing the occurrence of cracks, breakages, etc., in the glass due to the glass bonding material while coping with the type of glass to be bonded, and also to provide a multilayer glass using the glass bonding material.

BRIEF DESCRIPTION OF THE DRAWINGS

FIG. 6 is a cross-sectional view showing a structure of a reinforcing member according to a third modified example of the first embodiment of the present invention;

FIG. 7 is an enlarged cross-sectional view showing a sealing part of a vacuum multilayer glass according to a second embodiment of the present invention;

FIG. 8 is a cross-sectional view showing a structure of a reinforcing member according to the second embodiment of the present invention;

FIG. 9 is a cross-sectional view showing a structure of a reinforcing member according to a modified example of the second embodiment of the present invention;

FIG. 10 is a schematic diagram for explaining a peel strength test (Young's modulus is large) conducted to confirm the effects of the present invention;

FIG. 11 is a schematic diagram for explaining a peel strength test (Young's modulus is small) conducted to confirm the effects of the present invention;

FIG. 12 is a table showing results of Comparative Examples of the first example conducted to confirm the effects of the present invention;

FIG. 13 is a table showing results of examples of the first example conducted to confirm the effects of the present invention;

FIG. 14 is a table showing results of a second example conducted to confirm effects of the present invention;

FIG. 15 is a table showing results of a third example conducted to confirm effects of the present invention; and FIG. 16 is a table showing results of a reference example (corrosion resistance test).

DESCRIPTION OF THE PREFERRED EMBODIMENTS

Hereinafter, embodiments embodying the present invention will be described with reference to the drawings.

First Embodiment

First, the configuration of a vacuum multilayer glass 100 according to a first embodiment of the present invention will be described with reference to FIGS. 1 to 3. Note that the vacuum multilayer glass 100 is an example of the "multilayer glass" according to the present invention.

Figure 1:
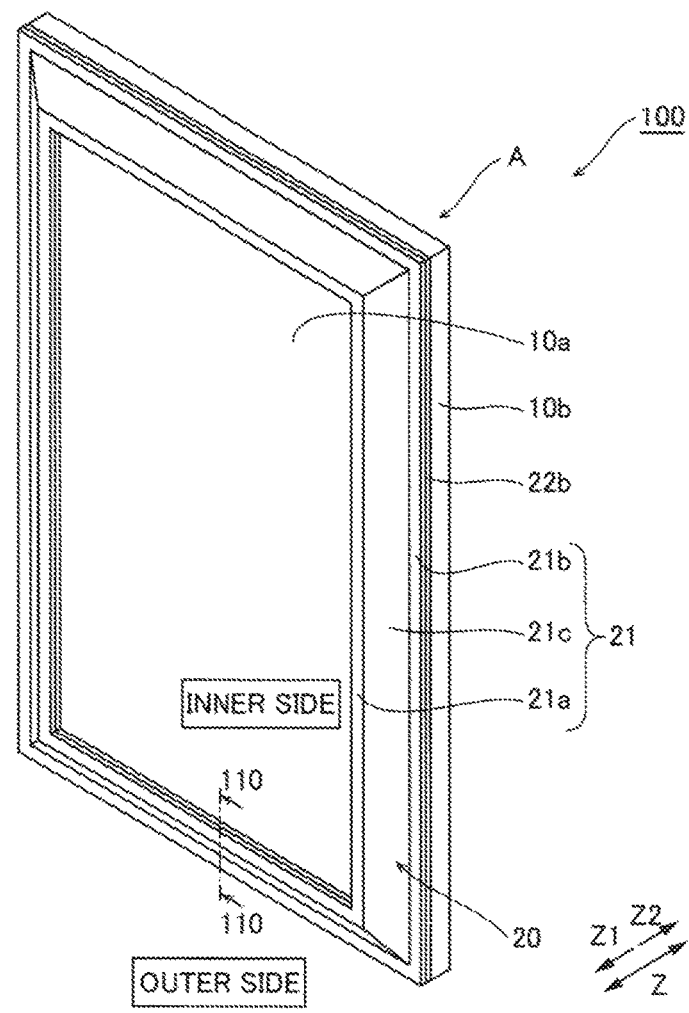
FIG. 1 is a perspective view showing a vacuum multilayer glass according to a first embodiment of the present invention.
Figure 2:
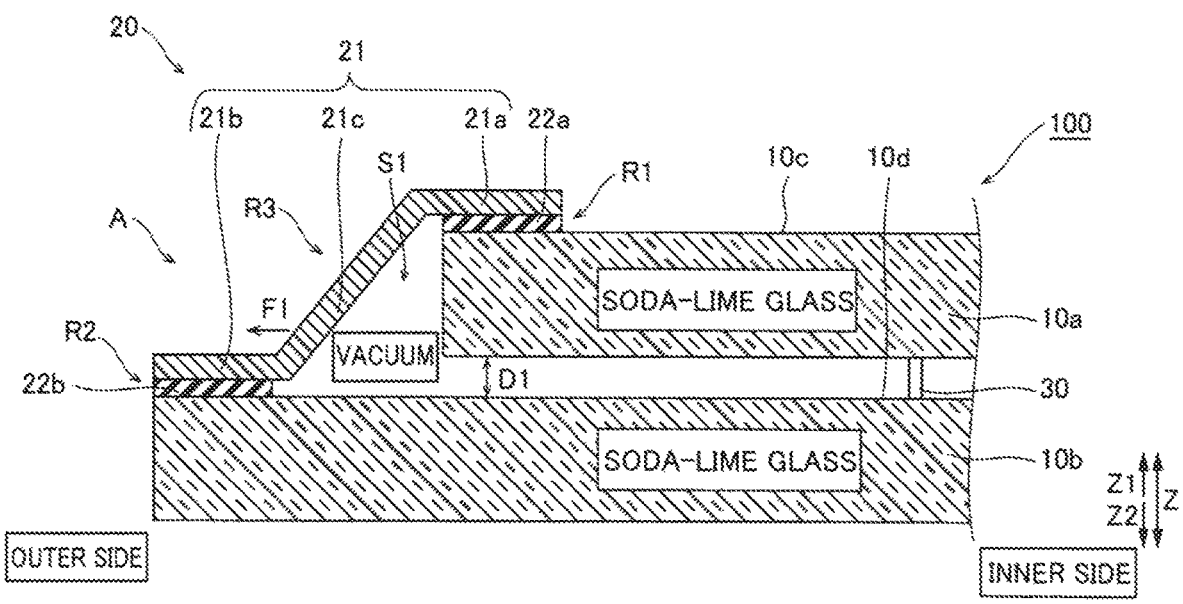
FIG. 2 is a cross-sectional view taken along the line 110-110 of FIG. 1.

The vacuum multilayer glass 100 according to the first embodiment of the present invention is provided with, as shown in FIG. 1 and FIG. 2, two glass plates 10a and 10b arranged so as to face with each other with a predetermined gap S1 therebetween and a sealing member 20 arranged at the sealing part A (peripheral region) provided at the entire circumference of the peripheral portion of the vacuum multilayer glass 100 for sealing the glass plate 10a and the glass plate 10b with the gap S1 therebetween. The length (distance D1) between the glass plate 10a and the glass plate 10b in the thickness direction (Z direction) of the gap S1 is about 200 µm. Also, the sealing member 20 includes an approximately Z-shaped reinforcing member 21 made of a cladding material, fritted glass 22a arranged between the reinforcing member 21 and the glass plate 10a to bond the reinforcing member 21 and the glass plate 10a, and fritted glass 22b arranged between the reinforcing member 21 and the glass plate 10b to bond the reinforcing member 21 and the glass plate 10b together. Note that the fritted glass 22a and 22b each are an example of the "glass" according to the present invention.

The glass plates 10a and 10b each are made of a soda-lime glass plate material produced by a material, such as, e.g., silica sand ($SiO_2$), sodium carbonate ($Na_2CO_3$), calcium carbonate ($CaCO_3$), etc., and having a thermal expansion coefficient from 30° C. to 400° C. of about $8.5 \times 10^{-6}$ ($K^{-1}$). The glass plates 10a and 10b each are an example of the "soda-lime glass" according to the present invention.

In addition, the glass plate 10a on the Z1 side is formed in a rectangular shape as viewed in the Z direction in a plan view, and the glass plate 10b on the Z2 side is formed in a rectangular shape larger than the glass plate 10a on the Z1 side in a plan view as viewed in the Z direction.

Further, between the glass plate 10a on the Z1 side and the glass plate 10b, a plurality of spacers 30 for securing a predetermined gap S1 are arranged. Also, the gap S1 between the glass plate 10a and the glass plate 10b is depressurized (reduced in pressure) to a pressure of about 0.001 Pa or more and about 0.2 Pa or less which is lower than atmospheric pressure by, for example, being degassed (vacuum drawn) from an exhaust port (not shown). As a result, since a medium for conducting heat is poor at the gap S1 between the glass plate 10a and the glass plate 10b, heat transfer is suppressed between the glass plate 10a and the glass plate 10b. As a result, it is configured such that the heat on one side of the glass plate 10a and the glass plate 10b is hardly moved to the other side. When such a vacuum multilayer glass 100 is arranged in, for example, a window of a house, the temperature difference between the outside of the house and the inside of the house (the temperature difference between the glass plate 10a and the glass plate 10b) increases. However, since it is possible to reduce the heat transfer between the inside and the outside of the house compared with a window using glass which is not a vacuum multilayer glass, the temperature change in the house due to the window can be suppressed.

On the other hand, as the temperature difference between the glass plate 10a and the glass plate 10b increases, the thermal stress due to the thermal expansion difference between the glass plate 10a and the glass plate 10b applied to the sealing member 20 increases. Therefore, in the sealing member 20, the stress applied to the bonding region R1 between the reinforcing member 21 and the fritted glass 22a and the stress applied to the bonding region R2 between the reinforcing member 21 and the fritted glass 22b increase.

For example, in FIG. 2, when the glass plate 10a side becomes high in temperature and the glass plate 10b side remains low in temperature, the glass plate 10a thermally expands. At this time, the end portion of the glass plate 10a moves outward, so that the reinforcing member 21 gradually rises from the tilted state shown in FIG. 2 and is deformed to approach from a Z-shape to an L-shape. Furthermore, a force toward the outside from the glass plate 10a is applied to the reinforcing member 21, so that the stress in the peel mode (mode in which stress concentrates on a bonded end portion on the pulled side (bonded end portion 600b shown in FIG. 10) of the bonding surface in the bonding region R2 between the fritted glass 22b and the reinforcing member 21, and the reinforcing member 21 is peeled off from the fritted glass 22b making the bonded end portion as a peeling starting point) is applied to the bonded edge portion of the bonding region R2. For this reason, large stress is generated in the fritted glass 22b, and therefore cracks or breakages become likely to occur, and a force F1 (see FIG. 2) in the peeling direction along the in-plane direction of the glass plate 10b acts between the fritted glass 22b and the reinforcing member 21, and therefore the fritted glass 22b and the reinforcing member 21 become likely to be peeled off. From this result, it is necessary to evaluate the bonding strength of the sealing member 20 (between the fritted glass 22b and the reinforcing member 21) in the peel mode mentioned above.

As shown in FIG. 1, the sealing member 20 is formed into a frame shape (annular shape) so as to be arranged at the sealing part A provided along the entire circumference (periphery) of the peripheral portion of the vacuum multilayer glass 100. As shown in FIG. 2, the sealing part A is arranged so as to connect the periphery of the glass plate 10a on the Z1 side and the periphery of the glass plate 10b on the Z2 side. In the sealing part A, the upper surface and both side surfaces of the sealing member 20 are exposed to the outside.

Also, the fritted glass 22a of the sealing member 20 is, in the bonding region R1 (region to be bonded to the first glass), bonded to the glass plate 10a in a state of being arranged on the upper surface (Z1 side) of the peripheral portion of the glass plate 10a. Further, the fritted glass 22b is, in the bonding region R2 (region to be bonded to the second glass), bonded to the glass plate 10b in a state of being arranged on the upper surface of the peripheral portion of the glass plate 10b. With this, it is configured such that the gap S1 between the glass plates 10a and 10b is sealed by the sealing member 20. Further, the fritted glass 22b is configured to be positioned outside the fritted glass 22a.

Further, the fritted glass 22a and 22b are made of a solidified material of $Bi_2O_3$ based fritted glass having a thermal expansion coefficient from 30° C. to 400° C. of about $8 \times 10^{-6}$ ($K^{-1}$). The $Bi_2O_3$ based fritted glass specifically means glass after melting powdered glass frit mainly containing $Bi_2O_3$ at a low temperature. That is, the $Bi_2O_3$ based fritted glass configuring the fritted glass 22a and 22b is configured to have a thermal expansion coefficient near the thermal expansion coefficient (about $8.5 \times 10^{-6}$ ($K^{-1}$)) of soda-lime glass so as to thermally expand approximately similar to soda-lime glass.

Further, the fritted glass 22a and 22b are configured to be formed between the reinforcing member 21 and the glass plate 10a, and between the reinforcing member 21 and the glass plate 10b, respectively, by melting $Bi_2O_3$ based powdered glass frit at about 500° C. and then solidifying it in a state in which the $Bi_2O_3$ based powdered glass frit in a paste state is arranged on the upper surface of the peripheral portion of the glass plate 10a and on the upper surface of the peripheral portion of the glass plate 10b, respectively.

As shown in FIG. 1, the reinforcing member 21 is formed into a frame shape so as to be arranged over the entire sealing part A. Further, as shown in FIG. 2, the reinforcing member 21 includes a flat planar inner end portion 21a which is to be bonded to the fritted glass 22a, a flat planar outer end portion 21b which is positioned lower (Z2 side) than the inner end portion 21a and is to be bonded to the fritted glass 22b, and an inclined portion 21c connecting the inner end portion 21a and the outer end portion 21b. As a result, the cross-sectional shape of the reinforcing member 21 is configured to be an approximately Z-shape obtained by stretching both ends of the Z-shape. Further, the reinforcing member 21 is pre-folded so that an inclined portion 21c is formed. The thickness t1 (see FIG. 3) of the reinforcing member 21 is equal to or larger than about 100 μm and equal to or smaller than about 500 μm. Note that the inner end portion 21a and the outer end portion 21b each are an example of the "parallel part" according to the present invention.

Further, the inner end portion 21a is formed in the bonding region R1. The inner end portion 21a is formed so as to extend approximately in parallel to the bonding surface 10c of the glass plate 10a to which the fritted glass 22a is bonded. Further, the outer end portion 21b is formed in the bonding region R2. The outer end portion 21b is formed so as to extend approximately in parallel to the bonding surface 10d of the glass plate 10b to which the fritted glass 22b is bonded.

Further, the inclined portion 21c is provided in the non-bonding region R3. The inclined portion 21c is formed so as to extend in an inclined state with respect to the bonding surfaces 10c and 10d.

Here, in the first embodiment, it is configured such that the Young's modulus of the reinforcing member 21 is about 110 GPa or less. In other words, the reinforcing member 21 has a property of being elastically deformed easily against an applied external force. The distance (distance L shown in FIG. 10) in the direction parallel to the bonding surface between the peeling starting point (the bonded end portion 600b shown in FIG. 10) when the reinforcing member 21 starts to detach from the fritted glass 22a or 22b and the portion of the reinforcing member 21 (the bent deformed portion 600c shown in FIG. 10) to which a vertical load indicated by an arrow is applied becomes shorter by the elastically deformed amount of the reinforcing member 21. That is, since the distance L shown in FIG. 11 when the Young's modulus is small becomes shorter than the distance L shown in FIG. 10 when the Young's modulus of the cladding material 1 is large in the direction parallel to the bonding surface, it is possible to reduce the stress applied to the peeling starting point. This is based on the finding of a new phenomenon that when the adhesion indicating the essential bonding property is the same degree, the material smaller in Young's modulus gives higher strength in measuring the bonding strength (peel strength) in a peel mode (a mode in which the reinforcing member 21 is peeled off from the fritted glass 22a or 22b bonded with the bonded end portion as the peeling starting point among bonding surfaces) as one method of evaluating the bonding strength between the fritted glass 22a or 22b and the reinforcing member 21. This makes it possible to effectively prevent the reinforcing member 21 from being peeled off from the fritted glass 22a or 22b.

Further, the Young's modulus of the reinforcing member 21 is preferably equal to or greater than about 85 GPa.

In the first embodiment, it is configured such that the thermal expansion coefficient $X \times 10^{-6}$ ($K^{-1}$) from 30° C. to 400° C. of the reinforcing member 21 satisfies the relationship of about $7.5 \leq X \leq 11.5$. That is, it is configured such that the reinforcing member 21 has a thermal expansion coefficient close to that of soda-lime glass (thermal expansion coefficient: about $8.5 \times 10^{-6}$ ($K^{-1}$)) or $Bi_2O_3$ based fritted glass (about $8 \times 10^{-6}$ ($K^{-1}$)) so as to thermally expand approximately similar to soda-lime glass and $Bi_2O_3$ based fritted glass. As a result, even in cases where the temperature difference between the glass plate 10a and the glass plate 10b is large, it is possible to suppress generation of large stress in the fritted glass 22a and 22b by the reinforcing member 21 or action of the force F1 in the peeling direction along the in-plain direction.

Figure 3:
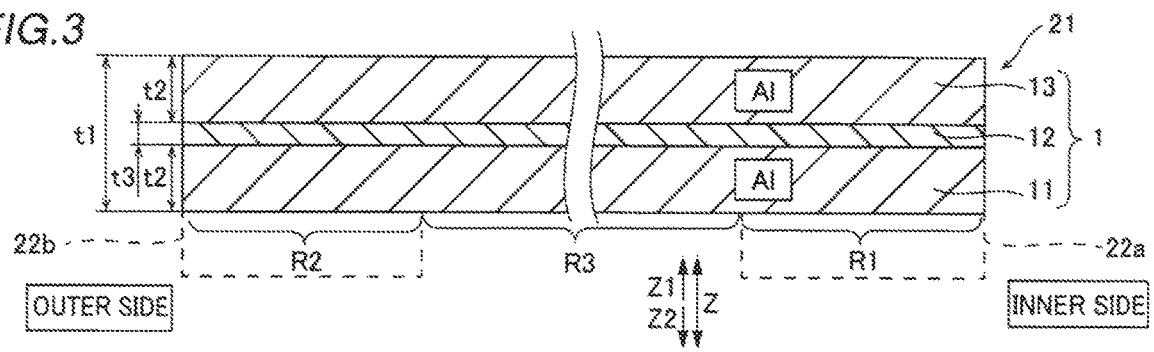
FIG. 3 is a cross-sectional view showing a structure of a reinforcing member according to the first embodiment of the present invention.

Further, in the first embodiment, as shown in FIG. 3, the reinforcing member 21 is made of an overlay type cladding material 1 of a three-layer structure. Specifically, the reinforcing member 21 is made of a cladding material 1 of a three-layer structure in which an Al layer 11 to be bonded to the fritted glass 22a and 22b to be formed on the Z2 side and made of an Al-based alloy, a core layer 12 having a Z2 side surface to which the Al layer 11 is bonded and made of an Fe—Ni based alloy, and an Al layer 13 bonded to the Z1 side surface of the core layer 12 and made of an Al-based alloy are bonded. Further, the Al layer 11 and the core layer 12 are bonded over the entire surface of the Z2 side surface of the core layer 12. The core layer 12 and the Al layer 13 are bonded over the entire surface of the Z1 side surface of the core layer 12. Thus, the cladding material 1 constitutes an overlay type cladding material. Further, the Al layer 11 and the core layer 12 are strongly bonded by atomic diffusion, compound formation, etc., and the core layer 12 and the Al layer 13 are strongly bonded by atomic diffusion, compound formation, etc. Note that the reinforcing member 21 is an example of the "glass bonding material" according to the present invention made of the cladding material 1, and the Al layer 11, the core material layer 12, and the Al layer 13 are examples of the "first layer", the "second layer", and the "third layer", respectively.

The reinforcing member 21 made of the cladding material 1 is bonded to the fritted glass 22a and 22b at the lower surface (the Z2 side surface) of the Al layer 11. That is, apart of the lower surface of the reinforcing member 21 (Al layer 11) is configured as a bonding surface to be bonded to the fritted glass 22a and 22b. Further, since the cladding material 1 constituting the reinforcing member 21 is a metal laminate member, the cladding material 1 is more likely to be elastically deformed or plastically deformed (cracks or breakages are less likely to occur) as compared with the glass to be bonded. Thus, it is configured such that deformations due to the thermal expansion can be reduced to some extent.

The Al layers 11 and 13 are configured such that both of them are made of the same Al-based alloy and have approximately the same thickness t2 in the thickness direction (Z direction). Since the surfaces of the Al layers 11 and 13 are high in adhesion to glass such as fritted glass, the Al layers 11 and 13 and the fritted glass 22a and 22b have a relationship that the peeling strength (peel strength) is increased.

Further, as the Al-based alloy constituting the Al layers 11 and 13, it is possible to use an Al alloy, such as, e.g., a pure Al of A1000 series, an Al—Si alloy of A4000 series, and an Al—Mg alloy of A5000 series. As the Al-based alloy, it is preferable to use soft pure Al, which has corrosion resistance and readily causes elastic deformation and plastic deformation to sufficiently absorb deformation against thermal expansion. Further, it is preferable that the Al-based alloy have less impurities such as Mg and Si. Specifically, in the Al-based alloy, the content rate of Al is preferably about 99.0 mass % or more, more preferably about 99.5 mass % or more. The Young's modulus of the Al layers 11 and 13 made of an Al-based alloy is smaller than the Young's modulus of the core layer 12 made of an Fe—Ni based alloy.

The Fe—Ni based alloy constituting the core layer 12 is made of at least of Ni, Fe, and inevitable impurity elements. In general, the expansion is lower than that of an Al-based alloy and the thermal expansion coefficient X1 from 30° C. to 400° C. is $11.5 \times 10^{-6}$ ($K^{-1}$) or less. As the Fe—Ni based alloy, it is preferable to be an Fe—Ni based alloy satisfying the relationship of about $7.5 \leq X \leq 11.5$ in thermal expansion coefficient $X1 \times 10^{-6}$ ($K^{-1}$) from 30° C. to 400° C. With this, it is possible to configure such that the thermal expansion coefficient $X \times 10^{-6}$ ($K^{-1}$) from 30° C. to 400° C. of the cladding material 1 having the core layer 12 can easily satisfy the relationship of about $7.5 \leq X \leq 11.5$. When the Al layers 11 and 13 are made of flexible pure Al, the thermal expansion coefficient X of the cladding material 1 becomes approximately the same value as the thermal expansion coefficient X1 of the core layer 12 since the contribution of the thermal expansion coefficient of the core layer 12 made of the Fe—Ni based alloy becomes larger.

As the Fe—Ni based alloy constituting the core layer 12, it is preferable to use either an Fe—Ni alloy or an Fe—Ni—Co alloy with smaller thermal expansion coefficient from 30° C. to 400° C., more preferable to use an Fe-(28 to 50)Ni-(0 to 20)Co alloy made of about 28 mass % or more and about 50 mass % or less of Ni, 0 mass % or more and about 20 mass % or less of Co, and the balance being Fe and inevitable impurity elements. Note that containing 0 mass % or more of Co means that Co is an arbitrary metallic element and does not need to be contained in the Fe—Ni based alloy.

Here, as an example of the Fe—Ni based alloy constituting the core layer 12, in the Fe-42Ni alloy made of about 42 mass % of Ni and the balance being Fe and inevitable impurity elements, the thermal expansion coefficient from 30° C. to 400° C. is about $5.8 \times 10^{-6}$ ($K^{-1}$), in an Fe-48Ni alloy made of about 48 mass % of Ni and the balance being Fe and inevitable impurity elements, the thermal expansion coefficient from 30° C. to 400° C. is about $8.7 \times 10^{-6}$ ($K^{-1}$). As an example of the Fe—Ni—Co based alloy, in the Fe-32Ni-8Co alloy made of about 32 mass % of Ni, about 8 mass % Co, and the balance being Fe and inevitable impurity elements, the thermal expansion coefficient from 30° C. to 400° C. is about $4.3 \times 10^{-6}$ ($K^{-1}$).

Further, as the Fe—Ni based alloy constituting the core layer 12, it is preferable to use either an Fe—Ni—Cr alloy or an Fe—Ni—Co—Cr alloy in which not only the thermal expansion coefficient from 30° C. to 400° C. is small but also it has corrosion resistance. It is more preferable to use an Fe-(28 to 50)Ni-(0 to 20)Co-(4 to 8)Cr alloy made of about 28 mass % or more and about 50 mass % or less of Ni, 0 mass % or more and about 20 mass % or less of Co, about 4 mass % or more and about 8 mass % or less of Cr, and the balance being Fe and inevitable impurity elements. Further, in order to further improve the corrosion resistance, it is more preferable to use an Fe-(28 to 50)Ni-(0 to 20)Co-(6 to 8)Cr alloy made of about 28 mass % or more and about about 50 mass % or less of Ni, 0 mass % or more and about 20 mass % or less of Co, about 6 mass % or more and about 8 mass % or less of Cr, and the balance being Fe and inevitable impurity elements.

Here, as an example of the Fe—Ni—Cr based alloy constituting the core layer 12, in the Fe-48Ni-3Cr alloy made of about 48 mass % of Ni, about 3 mass % of Cr, and the balance being Fe and inevitable impurity elements, the thermal expansion coefficient from 30° C. to 400° C. is about $8.9 \times 10^{-6}$ ($K^{-1}$). Further, as an example of the Fe—Ni—Co—Cr based alloy, in the Fe-30Ni-16Co-6Cr alloy made of about 30 mass % of Ni, about 16 mass % Co, about 6 mass % of Cr, and the balance being Fe and inevitable impurity elements, the thermal expansion coefficient from 30° C. to 400° C. is about $8.4 \times 10^{-6}$ ($K^{-1}$).

Further, the thickness t2 of each of the Al layers 11 and 13 is preferably equal to or larger than the thickness t3 of the core layer 12, more preferably twice or more the thickness t3. Further, it is more preferable that the thickness t2 be three times or more the thickness t3. The Young's modulus of the Al-based alloy constituting the Al layers 11 and 13 is configured to be smaller than the Young's modulus of the Fe—Ni based alloy constituting the core layer 12. As on example, in cases where the Al layers 11 and 13 are made of A1050 (pure Al) and the core layer 12 is made of an Fe-42Ni alloy made of 42 mass % of Ni and the balance being Fe and inevitable impurity elements, the Young's modulus of each of the Al layers 11 and 13 becomes about 70 GPa, which is smaller than the Young's modulus (about 164 GPa) of the core layer 12.

In the first embodiment, the following effects can be obtained.

In the first embodiment, as described above, since the cladding material 1 constituting the reinforcing member 21 includes the core layer 12 made of an Fe—Ni based alloy in which the thermal expansion coefficient X1 from 30° C. to 400° C. is equal to or less than $11.5 \times 10^{-6}$ ($K^{-1}$), it is possible to effectively suppress the thermal expansion of the Al layer 11 made of an Al-based alloy by the core layer 12 made of an Fe—Ni based alloy having a thermal expansion coefficient X1 from 30° C. to 400° C. of $11.5 \times 10^{-6}$ ($K^{-1}$) or less, which is generally lower in thermal expansion than the Al-based alloy. This makes it possible to reduce the thermal expansion coefficient of the entire reinforcing member 21, so it is possible to suppress the occurrence of cracks, breakages, etc., in the fritted glass 22a and 22b. Further, since the cladding material 1 is made of an Al-based alloy and includes the Al layer 11 to be bonded to the fritted glass 22a and 22b, the bonding between the Al-based alloy constituting the Al layer 11 and the fritted glass 22a and 22b is good. Therefore, it is possible to suppress peeling of the reinforcing member 21 from the fritted glass 22a and 22b. As a result, peeling of the reinforcing member 21 (Al layer 11) from the fritted glass 22a and 22b can be suppressed while suppressing the occurrence of cracks, breakages, etc., in the fritted glass 22a and 22b.

In the first embodiment, the reinforcing member 21 is made of the cladding material 1 in which at least the Al layer 11 made of an Al-based alloy and configured to be bonded to the fritted glass 22a and 22b and the core layer 12 made of the Fe—Ni based alloy are bonded. Since atomic diffusion, compound formation, etc., have occurred in the region where the Al layer 11 and the core layer 12 are bonded each other, as compared with the case of bonding the Al layer 11 and the core layer 12 by simple adhesion, etc., the bonding of the Al layer 11 and the core layer 12 becomes stronger. This enable to suppress peeling between the Al layer 11 and the core layer 12. Furthermore, since peeling can be similarly suppressed between the Al layer 13 and the core layer 12, peeling between the layers of the cladding material 1 can be suppressed as well. As a result, even if the interior (gap S1) of the vacuum multilayer glass 100 is lowered in pressure into high vacuum, the sealing property at the bonded portion between the Al layer 11 and the core layer 12 is not impaired, resulting in a suitable reinforcing member 21. As a result, it is possible to maintain the high vacuum in the gap S1 of the vacuum multilayer glass 100.

Further, in the first embodiment, by setting the Young's modulus of the reinforcing member 21 made of the cladding material 1 to about 110 GPa or less, the reinforcing member 21 can be easily elastically deformed. With this, the distance (distance L, see FIG. 10) in the direction parallel to the bonding surface between the peeling starting point (the bonded end portion 600b shown in FIG. 10) when the reinforcing member 21 starts to detach from the fritted glass 22a or 22b and the portion of the reinforcing member 21 (the bent deformed portion 600c shown in FIG. 10) to which a vertical load indicated by an arrow in FIG. 10 is applied to the bonding surface (a part of the lower surface) between the fritted glass 22a and 22b and the reinforcing member 21 becomes shorter by the elastically deformed amount of the reinforcing member 21. That is, the distance L shown in FIG. 11 when the Young's modulus of the cladding material is small becomes shorter than the distance L shown in FIG. 10 when the Young's modulus of the cladding material is large in the distance in the direction parallel to the bonding surface, and therefore the stress applied to the peeling starting point can be reduced. This makes it possible to effectively prevent peeling of the reinforcing member 21 from the fritted glass 22a and 22b.

In the first embodiment, the Al layer 11 is bonded to the glass plates 10a and 10b made of soda-lime glass via the fritted glass 22a and 22b and the cladding material 1 is configured such that the thermal expansion coefficient $X \times 10^{-6}$ ($K^{-1}$) from 30° C. to 400° C. satisfies the relationship of about $7.5 \leq X \leq 11.5$. As a result, the reinforcing member 21 made of the cladding material 1 has thermal expansion close to the thermal expansion coefficient from 30° C. to 400° C. (about $8.5 \times 10^{-6}$ ($K^{-1}$)) of soda-lime glass. Therefore, it is possible to suppress the occurrence of cracks, breakages, etc., in the glass plates 10a and 10b and the fritted glass 22a and 22b made of soda-lime glass.

In the first embodiment, by setting the acceptable range of the thermal expansion coefficient $X \times 10^{-6}$ ($K^{-1}$) of the cladding material 1 in the range smaller than the thermal expansion coefficient (about $8.5 \times 10^{-6}$ ($K^{-1}$)) of soda-lime glass to a range equal to or greater than about $7.5 \times 10^{-6}$ ($K^{-1}$), it is possible to suppress the occurrence of cracks, breakages, etc., in the fritted glass 22a and 22b even when a force in the tensile direction which tends to cause cracks or breakages is applied. Further, by setting the acceptable range of the thermal expansion coefficient $X \times 10^{-6}$ ($K^{-1}$) of the cladding material 1 in the range larger than the thermal expansion coefficient of soda-lime glass to a range of $11.5 \times 10^{-6}$ ($K^{-1}$) or less, it is possible to sufficiently suppress the occurrence of cracks, breakages, etc., in the fritted glass 22a and 22b. Therefore, by selecting the cladding material 1, it is possible to obtain the reinforcing member 21 capable of coping with the type of glass to be bonded.

In the first embodiment, the Young's modulus of the Al layers 11 and 13 made of an Al-based alloy is set to be smaller than the Young's modulus of the core layer 12 made of the Fe—Ni based alloy, and the thickness t2 of each of the Al layers 11 and 13 is set to be equal to or larger than the thickness t3 of the core layer 12. With this configuration, the thickness t2 of each of the Al layers 11 and 13 small in Young's modulus can be secured sufficiently, which makes it possible to make the reinforcing member 21 made of the cladding material 1 elastically deformable. As a result, the peel strength of the reinforcing member 21 can be improved. This makes it possible to more effectively prevent peeling of the reinforcing member 21 from the fritted glass 22a and 22b.

In the first embodiment, the Al layer 11 and the core layer 12 are bonded over the entire surface of the Z2 side surface of the core layer 12, and the core layer 12 and the Al layer 13 are bonded over the entire surface of the Z1 side surface of the core layer 12 to configure the overlay type cladding material 1. As a result, it is possible to suppress the occurrence of warpage in the cladding material 1 due to the fact that the one surface side of the cladding material 1 deforms (extends) larger than the other surface side at the time of producing the cladding material 1. Also, the cladding material 1 can be easily formed compared with an inlay type or edge lay type cladding material in which a layer structure is formed only at a part of the cladding material 1. As a result, the reinforcing member 21 can be efficiently produced by using an overlay type cladding material 1 of a three-layer structure as the reinforcing member 21.

Further, in the first embodiment, since the Al layer 11 and the Al layer 13 are not only made of the same Al-based alloy but also have approximately the same thickness t1, it is possible to suppress the warp of the cladding material 1. At the same time, it is not necessary to strictly distinguish the front and back of the reinforcing member 21 made of the cladding material 1, so that handling of the reinforcing member 21 can be made easier.

In the first embodiment, the Fe—Ni based alloy constituting the core layer 12 includes 28 mass % or more and 50 mass % or less of Ni, 0 mass % or more and 20 mass % or less of Co, 0 mass % or more and 8 mass % or less of Cr, and the balance being Fe and inevitable impurity elements. With such a structure, since the Fe—Ni based alloy constituting the core layer 12 contains at least 28 mass % or more and 50 mass % or less of Ni, the core layer 12 can be assuredly made to have lower expansion. Also, in cases where the Fe—Ni based alloy contains Co (when it contains more than 0 mass % of Co), it is possible to increase the Curie point (the transition point in the thermal expansion curve) of the Fe—Ni based alloy. Therefore, the thermal expansion coefficient of the core layer 12 and the cladding material 1 can be kept small. Further, since the Fe—Ni based alloy contains 20 mass % or less of Co, the used amount of expensive Co can be suppressed. Furthermore, in cases where the Fe—Ni based alloy contains Cr (when it contains more than 0 mass % of Cr), it is possible to improve the corrosion resistance of the core layer 12. In addition, since the Fe—Ni based alloy contains 8 mass % or less of Cr, it is possible to suppress the increase of the thermal expansion coefficient of the Fe—Ni based alloy while improving the corrosion resistance of the core layer 12. More preferably, the Fe—Ni based alloy constituting the core layer 12 contains 4 mass % or more and 8 mass % or less of Cr. In this case, the corrosion resistance of the core layer 12 can be assuredly improved.

In the first embodiment, the content rate of Al in the Al-based alloy constituting the Al layers 11 and 13 is set to about 99.0 mass % or more. With this structure, since impurity elements (for example, Mg, Si, etc.) other than Al contained in the Al-based alloy can be reduced, the bonding of the Al-based alloy constituting the Al layer 11 and the fritted glass 22a and 22b can be further improved.

In the first embodiment, the reinforcing member 21 is used for the sealing part A of the vacuum multilayer glass 100 to which large thermal stress is applied due to a large temperature difference generated between the glass plate 10a side and the glass plate 10b side of the vacuum multilayer glass 100. Therefore, it is possible to suppress peeling of the reinforcing member 21 from the fritted glass 22a and 22b while suppressing the occurrence of cracks, breakages, etc., in the fritted glass 22a and 22b arranged in the sealing part A.

In the first embodiment, by setting the Young's modulus of the cladding material 1 to about 85 GPa or more and about 100 GPa or less, it is possible to more effectively suppress peeling of the reinforcing member 21 from the fritted glass 22a and 22b while maintaining the rigidity of the cladding material 1.

In the first embodiment, by setting the thickness t2 of each of the Al layers 11 and 13 to about twice or more the thickness t3 of the core layer 12, the thickness t2 of the Al layers 11 and 13 small in Young's modulus can be secured further sufficiently. As a result, the peel strength of the reinforcing member 21 can be further improved.

Further, in the first embodiment, the cladding material 1 includes the inner end portion 21a formed in the bonding region R1 and extending approximately parallel to the bonding surface 10c of the glass plate 10a to which the fritted glass 22a is bonded, the outer end portion 21b formed in the bonding region R2 and extending approximately parallel to the bonding surface 10d of the glass plate 10b to which the fritted glass 22b is bonded, and the inclined portion 21c extending in an inclined state with respect to the bonding surfaces 10c and 10d so as to connect the inner end portion 21a and the outer end portion 21b. As a result, while favorably securing the bonding of the reinforcing member 21 and the glass plates 10a and 10b with the inner end portion 21a and the outer end portion 21b, it is possible to easily form the gap S1 between the glass plate 10a and the glass plate 10b by separating the glass plate 10a and the glass plate 10b from each other with the inclined portion 21c. With this, it is possible to easily form the gap S1 in the vacuum multilayer glass 100 and vacuum the inside of the gap S1.

In the first embodiment, in a vacuum multilayer glass 100 formed by arranging two glass plates 10a and 10b with a gap S1 therebetween and bonding the periphery of the two glass plates 10a and 10b with the sealing member 20, the sealing member 20 is formed by bonding the reinforcing member 21 and the fritted glass 22a and 22b. As a result, using the reinforcing member 21 capable of suppressing peeling from the fritted glass 22a and 22b while suppressing the occurrence of cracks, breakages, etc., in the fritted glass 22a and 22b, a vacuum multilayer glass 100 in which the two glass plates 10a and 10b are bonded together with the gap S1 therebetween can be obtained.

Further, in the first embodiment, since bonding of glass can be formed by bonding the fritted glass 22a to the glass plate 10a and bonding the fritted glass 22b to the glass plate 10b, peeling of the sealing member 20 and the glass plate 10a and 10b can be effectively suppressed.

First Modified Example of First Embodiment

Next, a first modified example of the first embodiment of the present invention will be described with reference to FIG. 4. In this first modified example of the first embodiment, unlike the first embodiment in which the reinforcing member 21 is made of an overlay type cladding material 1, an embodiment in which core layers 112a and 112b of a reinforcing member 121 are arranged only at positions facing the bonding regions R1 and R2 will be described. The reinforcing member 121 is one example of the "glass bonding material" made of the cladding material 101 according to the present invention.

Figure 4:
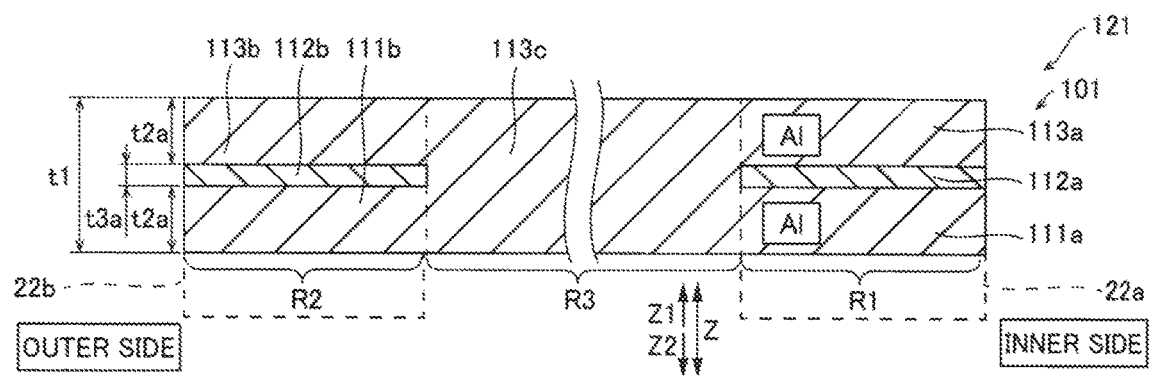
FIG. 4 is a cross-sectional view showing a structure of a reinforcing member according to a first modified example of the first embodiment of the present invention.

As shown in FIG. 4, the reinforcing member 121 according to the first modified example of the first embodiment of the present invention is configured by a cladding material 101 in which a three-layer structure is formed only in the bonding regions R1 and R2 and a single layer structure (no layer structure is formed) is formed in the region other than the bonding regions R1 and R2.

Specifically, on the inner side of the cladding material 101 (one side in the direction perpendicular to the thickness direction of the cladding material 101), an Al layer 111a made of an Al-based alloy to be bonded to the fritted glass 22a, a core layer 112a made of an Fe—Ni based alloy, and an Al portion 113a made of an Al-based alloy are laminated in this order from the Z2 side to the Z1 side and bonded together. Further, on the outer side of the cladding material 101 (the other side in the direction perpendicular to the thickness direction of the cladding material 101), an Al layer 111b made of an Al-based alloy to be bonded to the fritted glass 22b, a core layer 112b made of an Fe—Ni based alloy, and an Al portion 113b made of an Al-based alloy are laminated in this order from the Z2 side to the Z1 side and bonded together. Further, the core layer 112a is arranged at a position facing the bonding region R1 where the Al layer 111a and the fritted glass 22a are bonded in the thickness direction (Z direction), and the core layer 112b is arranged at a position facing the bonding region R2 where the Al layer 111b and the fritted glass 22b are bonded in the thickness direction. The thermal expansion coefficient X1 from 30° C. to 400° C. of the Fe—Ni based alloy constituting the core layers 112a and 112b is equal to or less than $11.5 \times 10^{-6}$ $(K^{-1})$. Note that the Al layer 111a and the Al layer 111b each are an example of the "first layer" according to the present invention, and the core layers 112a and 112b each are an example of the "second layer" according to the present invention.

Further, in the non-bonding region R3 (region in which the fritted glass 22a and 22b are not arranged) connecting the bonding regions R1 and R2, only an Al portion 113c made of an Al-based alloy is arranged over the entire thickness direction. That is, a core layer made of an Fe—Ni based alloy is not arranged in the non-bonding region R3. Note that the Al portion 113c is integrally connected to the Al layers 111a, 111b, 113a, and 113b. As a result, the Al layers 111a, 111b, 113a, and 113b and the Al portion 113c are made of the same Al-based alloy.

Further, at positions facing the bonding regions R1 and R2, the core layers 112a and 112b are arranged so as to be embedded in the Al-based alloy.

Further, the Al layers 111a, 111b, 113a, and 113b are configured to have approximately the same thickness t2a in the thickness direction (Z direction). The thickness t2a of each of the Al layers 111a, 111b, 113a, and 113b is preferably equal to or larger than the thickness t3a of each of the core layers 112a and 112b, more preferably twice or more the thickness t3a. Other configurations of the first modified example of the first embodiment are the same as those of the first embodiment.

In the first modified example of the first embodiment, the following effects can be obtained.

In the first modified example of the first embodiment, as described above, the cladding material 101 constituting the reinforcing member 121 includes core layers 112a and 112b made of an Fe—Ni based alloy in which a thermal expansion coefficient X1 from 30° C. to 400° C. is equal to or less than $11.5×10^{-6}$ ($K^{-1}$), and Al layers 111a and 111b each made of an Al-based alloy and configured to be bonded to the fritted glass 22a and 22b, respectively. Therefore, in the same manner as in the first embodiment, it is possible to suppress peeling of the reinforcing member 121 (Al layers 111a and 111b) from the fritted glass 22a and 22b while suppressing the occurrence of cracks, breakages, etc., in fritted glass 22a and 22b due to the reinforcing member 121.

Further, in the first modified example of the first embodiment, the core layer 112a made of an Fe—Ni based alloy is arranged at a position facing the bonding region R1 where the Al layer 111a and the fritted glass 22a are bonded in the thickness direction, and the core layer 112b made of an Fe—Ni based alloy is arranged at a position facing the bonding region R2 where the Al layer 111b and the fritted glass 22b are bonded in the thickness direction. Further, a core layer made of an Fe—Ni based alloy is not arranged in the non-bonding region R3. As a result, by the core layers 112a and 112b made of the Fe—Ni based alloy having lower expansion than that of the Al based alloy arranged at positions facing the bonding regions R1 and R2 in the thickness direction of the cladding material 101, the used amount of the Fe—Ni based alloy constituting the core layers 112a and 112b can be reduced while assuredly suppressing the thermal expansion of the Al layers 111a and 111b made of an Al-based alloy. As a result, even in cases where the Al layers 111a and 111b made of an Al-based alloy having large thermal expansion are bonded to a glass member, it is possible to further suppress the occurrence of cracks, breakages, etc., in the fritted glass 22a and 22b.

Further, in the first modified example of the first embodiment, the core layers 112a and 112b are arranged so as to be embedded in the Al-based alloy at the positions facing the bonding regions R1 and R2. Therefore, compared with the case in which the core layers are arranged on the Z1 side surfaces opposite to the bonding regions R1 and R2, the core layers 112a and 112b can be arranged at positions closer to the bonding regions R1 and R2, respectively. Therefore, it is possible to effectively suppress the thermal expansion of the Al layers 111a and 111b.

Further, in the first modified example of the first embodiment, even in cases where stress caused by a temperature difference between a pair of glass plates (not shown) is applied, since the Al portion 113c made of a stretchy Al-based alloy having a small Young's modulus is formed over the entire thickness direction (Z direction) between the bonding region R1 and the bonding region R2 where the Al layers 111a and 111b are arranged, respectively, the applied stress can be suppressed. As a result, the occurrence of cracks, breakages, etc., in the fritted glass 22a and 22b due to the reinforcing member 121 can be further suppressed while securing the bonding of the reinforcing member 121 and the fritted glass 22a and 22b in the bonding regions R1 and R2. Other effects of the first modified example of the first embodiment are the same as those of the first embodiment.

Second Modified Example of First Embodiment

Next, a second modified example of the first embodiment of the present invention will be described with reference to FIG. 5. In the second modified example of the first embodiment, unlike the first modified example of the first embodiment in which the core layers 112a and 112b are arranged so as to be embedded in the Al-based alloy, a case in which core layers 212a and 212b are exposed on the surface will be described.

Figure 5:
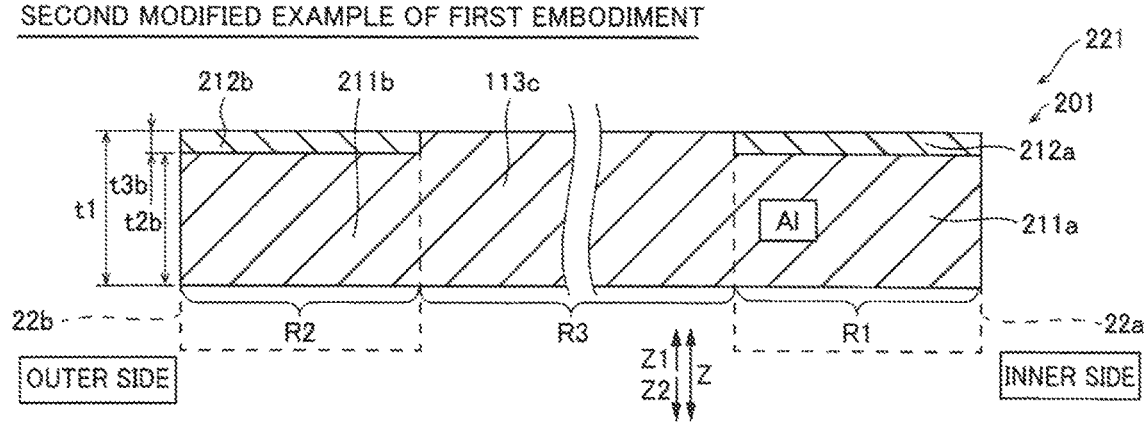
FIG. 5 is a cross-sectional view showing a structure of a reinforcing member according to a second modified example of the first embodiment of the present invention.

As shown in FIG. 5, the reinforcing member 221 according to the second modified example of the first embodiment of the present invention is configured by a cladding material 201 in which a two-layer structure is formed only in bonding regions R1 and R2 and a single layer structure (no layer structure is formed) is formed in the region other than the bonding regions R1 and R2. Note that the reinforcing member 221 is one example of the "glass bonding material" made of the cladding material 201 according to the present invention.

Specifically, on the inner side of the cladding material 201, an Al layer 211a made of an Al-based alloy to be bonded to the fritted glass 22a, and a core layer 212a made of an Fe—Ni based alloy and arranged at a position facing the bonding region R1 of the Al layer 211a and the fritted glass 22a in the thickness direction (Z direction) are bonded. Further, on the outer side of the cladding material 201, an Al layer 211b made of an Al-based alloy to be bonded to the fritted glass 22b, and a core layer 212b made of an Fe—Ni based alloy and arranged at a position facing the bonding region R2 of the Al layer 211b and the fritted glass 22b in the thickness direction are bonded. Further, at positions facing the bonding regions R1 and R2, the core layers 212a and 212b are arranged on the Z1 side surfaces opposed to the bonding regions R1 and R2. As a result, the cladding material 201 has an inlay type cladding material configuration. The thermal expansion coefficient X1 from 30° C. to 400° C. of the Fe—Ni based alloy constituting the core layers 212a and 212b is equal to or less than $11.5×10^{-6}$ ($K^{-1}$). Note that the Al layer 211a and the Al layer 211b each are an example of the "first layer" according to the present invention, and the core layers 212a and 212b each are an example of the "second layer" according to the present invention.

The Al layers 211a and 211b are configured to have approximately the same thickness t2b in the thickness direction (Z direction). Further, the thickness t2b of each of the Al layers 211a and 211b is preferably equal to or larger than the thickness t3b of each of the core layers 212a and 212b, more preferably three times or more the thickness t3b. More preferably, the thickness t2b is six times or more the thickness t3b. Other configurations of the second modified example of the first embodiment are the same as those of the first embodiment.

In the second modified example of the first embodiment, the following effects can be obtained.

In the second modified example of the first embodiment, as described above, the cladding material 201 includes core layers 212a and 212b made of an Fe—Ni based alloy in which a thermal expansion coefficient X1 from 30° C. to 400° C. is equal to or less than $11.5×10^{-6}$ ($K^{-1}$), and Al layers 211a and 211b made of an Al-based alloy and configured to be bonded to the fritted glass 22a and 22b, respectively. Therefore, in the same manner as in the first embodiment, it is possible to suppress peeling of the reinforcing member 221 (Al layers 211a and 211b) from the fritted glass 22a and 22b while suppressing the occurrence of cracks, breakages, etc., in the fritted glass 22a and 22b due to the reinforcing member 221.

Further, in the second modified example of the first embodiment, at positions facing the bonding regions R1 and R2, the core layers 212a and 212b are arranged on the Z1 side surfaces opposed to the bonding regions R1 and R2. Therefore, the cladding material 201 can be easily produced as compared with the case in which the core layer is arranged so as not to be exposed on the surface of the reinforcing member. Other effects of the second modified example of the first embodiment are the same as those of the first embodiment.

Third Modified Example of First Embodiment

Next, a third modified example of the first embodiment of the present invention will be described with reference to FIG. 6. In this third modified example of the first embodiment, unlike the first embodiment in which the reinforcing member 21 is configured by an overlay type cladding material 1 of a three-layered structure, an embodiment in which a reinforcing member 321 is configured by a two-layer structure of an overlay time cladding material 301 will be described. Note that the reinforcing member 321 is one example of the "glass bonding material" made of the cladding material 301 according to the present invention.

As shown in FIG. 6, the reinforcing member 321 according to the third modified example of the first embodiment of the present invention is configured by an overlay type cladding material 301 of a two-layer structure. Specifically, the reinforcing member 321 is configured by a cladding material 301 of a two-layer structure in which an Al layer 311 to be bonded to the fritted glass 22*a* and 22*b* and made of an Al-based alloy, and a core layer 312 having a Z2 side surface to which the Al layer 311 is bonded and made of an Fe—Ni based alloy are bonded. Further, the Al layer 311 and the core layer 312 are bonded over the entire surface of the Z2 side surface of the core layer 312, so that the cladding material 301 constitutes an overlay type cladding material. The thermal expansion coefficient X1 from 30° C. to 400° C. of the Fe—Ni based alloy constituting the core layer 312 is equal to or less than $11.5 \times 10^{-6}$ ($K^{-1}$). Note that the Al layer 311 and the core layer 312 are examples of the "first layer" and the "second layer" according to the present invention, respectively.

Further, the thickness t2c of the Al layer 311 is preferably equal to or larger than the thickness t3c of the core layer 312, more preferably three times or more the thickness t3c. More preferably, the thickness t2c is six times or more the thickness t3c. Further, other configurations of the third modified example of the first embodiment are the same as those of the first embodiment.

In the third modified example of the first embodiment, the following effects can be obtained.

In the third modified example of the first embodiment, as described above, the cladding material 301 includes the core layer 312 made of an Fe—Ni based alloy in which a thermal expansion coefficient X1 from 30° C. to 400° C. is equal to or less than $11.5 \times 10^{-6}$ ($K^{-1}$) and an Al layer 311 made of an Al-based alloy and configured to be bonded to the fritted glass 22*a* and 22*b*. Therefore, in the same manner as in the first embodiment, it is possible to suppress peeling of the reinforcing member 321 (Al layer 311) from the fritted glass 22*a* and 22*b* to be bonded while suppressing the occurrence of cracks, breakages, etc., in the fritted glass 22*a* and 22*b* to be bonded due to the reinforcing member 321.

In the third modified example of the first embodiment, the reinforcing member 321 is configured by a cladding material 301 of a two-layer structure. Compared with a case in which a cladding material of a three-layer structure is formed, it is possible to reduce the number of members required for forming the cladding material 301 (the plate material for forming the Al layer 13 of the first embodiment). Other effects of the third modified example of the first embodiment are the same as those of the second modified example of the first embodiment.

Second Embodiment

Next, a second embodiment of the present invention will be described with reference to FIGS. 7 and 8. In the second embodiment, unlike the first embodiment in which the upper surface side and the side surface sides of the sealing member 20 are exposed to the outside in the sealing part A, an embodiment in which the sealing part B is formed inner than the periphery of the glass plates 410*a* and 410*b* will be described.

The vacuum multilayer glass 400 according to the second embodiment of the present invention is provided with, as shown in FIG. 7, two glass plates 410*a* and 410*b* arranged so as to face each other with a predetermined gap S2 therebetween and a sealing member 420 arranged at the sealing part B (peripheral region) provided at the entire circumference of the peripheral portion of the vacuum multilayer glass 400 for sealing the glass plate 410*a* and the glass plate 410*b* with the gap S2 therebetween. The length (distance D2) between the glass plate 410*a* and the glass plate 410*b* in the thickness direction (Z direction) of the gap S2 is about 200 μm. Also, the sealing member 420 includes a reinforcing member 421 made of a cladding material, fritted glass 422*a* arranged between the reinforcing member 421 and the glass plate 410*a* and configured to bond the reinforcing member 421 and the glass plate 410*a*, and fritted glass 422*b* arranged between the reinforcing member 421 and the glass plate 410*b* and configured to bond the reinforcing member 421 and the glass plate 410*b* together. Note that the vacuum multilayer glass 400 is an example of the "multilayer glass" according to the present invention and the fritted glass 422*a* and 422*b* is an example of the "glass" according to the present invention.

Further, the glass plate 410*a* on the Z1 side and the glass plate 410*b* on the Z2 side each are formed into an approximately rectangular shape having approximately the same size as viewed from the Z direction in a plan view.

The sealing member 420 is formed into a frame shape so as to be arranged at the sealing part B provided along the entire circumference of the peripheral portion of the vacuum multilayer glass 400. The sealing part B is formed inner than the periphery of the glass plates 410*a* and 410*b*. In the sealing part B, only the outer side surface among side surfaces of the sealing member 420 is exposed to the outside, and the inner side surface and the upper surface are not exposed to the outside.

The fritted glass 422*a* of the sealing member 420 is arranged on the inner side of the peripheral portion of the glass plate 410*a* (on the Z2 side, the inner side of the reinforcing member 421), and the fritted glass 422*b* is arranged on the outer side (the Z1 side, the outer side of the reinforcing member 421) of the peripheral portion of the glass plate 410*b*.

The reinforcing member 421 is formed into a frame shape (annular shape) so as to be arranged over the entire sealing part B. Further, the reinforcing member 421 includes a flat planar inner end portion 421*a* which is to be bonded to the fritted glass 422*a*, a flat planar outer end portion 421*b* which is positioned upper (Z1 side) than the inner end portion 421*a* and configured to be bonded to the fritted glass 422*b*, and an inclined portion 421*c* connecting the inner end portion 421*a* and the outer end portion 421*b*. Note that the inner end portion 421a and the outer end portion 421b each are an example of the "parallel part" according to the present invention.

Further, the inner end portion 421a is formed in the bonding region R11. The inner end portion 421a is formed so as to extend approximately in parallel to the bonding surface 410c of the glass plate 410a to which the fritted glass 422a is bonded. Further, the outer end portion 421b is formed in the bonding region R12. The outer end portion 421b is formed so as to extend approximately in parallel to the bonding surface 410d of the glass plate 410b to which the fritted glass 422b is bonded.

Further, the inclined portion 421c is provided in the non-bonding region R13. The inclined portion 421c is formed so as to extend in an inclined state with respect to the bonding surfaces 410c and 410d.

In the reinforcing member 421, it is configured such that the cross-sectional shape of the reinforcing member 421 which was originally in a flat-plate shape is formed into an approximately Z-shape by being pressurized at the time of sealing the glass plate 410a and the glass plate 410b. The difference in the height position between the inner end portion 421a and the outer end portion 421b in the thickness direction (Z direction) is smaller than the difference between the inner end portion 21a and the outer end portion 21b in the reinforcing member 21 in the first embodiment (see FIG. 2). Therefore, the inclination of the inclined portion 421c is gentler than the inclination of the inclined portion 21c (see FIG. 2) in the first embodiment. The thickness t1 of the reinforcing member 421 is equal to or more than about 100 μm and equal to or less than about 200 μm.

Further, in the same manner as in the first embodiment, as shown in FIG. 8, the reinforcing member 421 is constituted by an overlay type cladding material 1 of a three-layer structure. That is, the reinforcing member 421 is constituted by a cladding material of a three-layer structure 1 in which an Al layer 11 made of an Al-based alloy, a core layer 12 made of an Fe—Ni based alloy in which the thermal expansion coefficient X1 from 30° C. to 400° C. is equal to or less than $11.5 \times 10^{-6}$ ($K^{-1}$), and an Al layer 13 made of an Al-based alloy are bonded. Further, it is configured such that in the bonding region R11 of the inner end portion 421a, the Al layer 13 arranged on the Z1 side of the cladding material 1 and the fritted glass 422a are bonded, and in the bonding region R12 of the outer end portion 421b, the Al layer 11 arranged on the Z2 side of the cladding material 1 and the fritted glass 422b are bonded. Other configurations of the second embodiment are the same as those of the first embodiment.

In the second embodiment, the following effects can be obtained.

In the second embodiment, as described above, the cladding material 1 includes the core layer 12 made of an Fe—Ni based alloy in which the thermal expansion coefficient X1 from 30° C. to 400° C. is equal to or less than $11.5 \times 10^{-6}$ ($K^{-1}$) and Al layers 11 and 13 each made of an Al-based alloy and configured to be bonded to the fritted glass 422a and 422b, respectively. Therefore, in the same manner as in the first embodiment, it is possible to suppress peeling of the reinforcing member 421 (Al layers 11 and 13) from the fritted glass 422a and 422b while suppressing the occurrence of cracks, breakages, etc., in the fritted glass 422b and 422a due to the reinforcing member 421.

In the second embodiment, since the sealing part B is formed inner than the periphery of the glass plates 410a and 410b, it is possible to prevent the portion of the sealing member 420 other than the outer side surface from being exposed to the outside, which in turn can suppress corrosion of the sealing member 420 arranged at the sealing part B.

In the second embodiment, the reinforcing member 421 which was originally in a flat-plate shape is configured such that the cross-sectional shape is formed into an approximately Z-shape by being pressurized during the sealing of the glass plate 410a and the glass plate 410b. With this configuration, it is not required to bend the reinforcing member 421 into an approximately Z-shape in advance, which can simplify the producing process of the sealing member 420 (reinforcing member 421). Other effects of the second embodiment are the same as those of the first embodiment.

Modified Example of Second Embodiment

Next, a modified example of the second embodiment of the present invention will be described with reference to FIG. 9. In this modified example of the second embodiment, unlike the second embodiment in which the reinforcing member 421 is made of an overlay type cladding material 1, an embodiment in which core layers 512a and 512b of a reinforcing member 521 are arranged only at positions facing the bonding regions R11 and R12, respectively, will be described. Note that the reinforcing member 521 is one example of the "glass bonding material" made of the cladding material 501 according to the present invention.

As shown in FIG. 9, the reinforcing member 521 according to the modified example of the second embodiment of the present invention is made of a cladding material 501 in which a two-layer structure is formed only in the bonding regions R11 and R12 and a single layer structure (no layer structure is formed) is formed in the region other than the bonding regions R11 and R12.

Specifically, on the inner side of the cladding material 501, an Al layer 511a made of an Al-based alloy to be bonded to the fritted glass 422a and a core layer 512a made of an Fe—Ni based alloy and arranged at a position facing the bonding region R11 of the Z1 side Al layer 511a and the fritted glass 422a in the thickness direction (Z direction) are bonded. Further, on the outer side of the cladding material 501, an Al layer 511b made of an Al-based alloy to be bonded to the fritted glass 422b and a core layer 512b made of an Fe—Ni based alloy and arranged at a position facing the bonding region R12 of the Al layer 511b and the fritted glass 422b in the thickness direction are bonded. Further, in the non-bonding region R13, only the Al portion 113c made of an Al-based alloy is arranged over the entire thickness direction. The thermal expansion coefficient X1 from 30° C. to 400° C. of the Fe—Ni based alloy constituting the core layers 512a and 512b is equal to or less than $11.5 \times 10^{-6}$ ($K^{-1}$). Note that the Al layer 511a and the Al layer 511b each are an example of the "first layer" according to the present invention and the core layers 512a and 512b each are an example of the "second layer" according the present invention.

At the position facing the bonding region R11, the core layer 512a is arranged on the Z2 side surface opposite to the bonding region R11, and at the position facing the bonding region R12, the core layer 512b is arranged on the Z1 side surface opposite to the bonding region R12. As a result, the cladding material 501 has an inlay type cladding material configuration. Other configurations of the modified example of the second embodiment are the same as those of the second embodiment.

In the modified example of the second embodiment, the following effects can be obtained.

In the modified example of the second embodiment, as described above, the cladding material 501 includes core layers 512a and 512b each made of an Fe—Ni based alloy in which the thermal expansion coefficient X1 from 30° C. to 400° C. is equal to or less than $11.5 \times 10^{-6}$ $(K^{-1})$ and Al layers 511a and 511b each made of an Al-based alloy and configured to be bonded to the fritted glass 422a and 422b, respectively. Therefore, in the same manner as in the first embodiment, it is possible to suppress peeling of the reinforcing member 521 (Al layers 511a and 551b) from the fritted glass 422a and 422b while suppressing the occurrence of cracks, breakages, etc., in the fritted glass 422a and 422b due to the reinforcing member 521.

In the modified example of the second embodiment, at the position facing the bonding region R11, the core layer 512a is arranged on the Z2 side surface opposite to the bonding region R11, and at the position facing the bonding region R12, the core layer 512b is arranged on the Z1 side surface opposite to the bonding region R12. Thus, compared with the case where a core layer is embedded in the Al-based alloy (for example, in the case of the first modified example of the first embodiment shown in FIG. 4), the cladding material 501 can be easily produced.

Further, in the modified example of the first embodiment, even in cases where stress caused by a temperature difference between a pair of glass plates (not illustrated) is applied, since the Al portion 113c made of a stretchy Al-based alloy having a small Young's modulus is formed in the entire thickness direction (Z direction) between the bonding region R11 and the bonding region R12, the applied stress can be suppressed. This makes it possible to more effectively suppress the occurrence of cracks, breakages, etc., in the fritted glass 422a and 422b due to the reinforcing member 521. Other effects of the modified example of the second embodiment are the same as those of the second embodiment.

First Example

Next, with reference to FIGS. 1, 3, and 10 to 13, a first example carried out to confirm the effects of the present invention will be described.

In the first embodiment, assuming that the cladding material 1 shown in FIG. 3 is used for a glass bonding material, a plurality of overlay type cladding materials of a three-layer structure (see FIG. 3) different in composition and thickness were prepared. For each cladding material (test material), the Young's modulus and thermal expansion coefficient were measured. Further, the presence or absence of occurrence of cracks in fritted glass and the peel strength were measured when the cladding material (test material) was bonded to a glass plate made of soda-lime glass via the fritted glass. In the first example, the thickness t1 (see FIG. 10) of the test piece was set to 100 μm, and before the test, the internal stress, etc., were removed by annealing each test piece at an appropriate temperature.

Here, as each of test pieces of Examples 1 to 8 of the first example, a cladding material of a three-layer structure in which an Al layer made of A1050 (pure aluminum) containing 99.5 mass % or more of Al, a core layer made of an Fe—Ni based alloy in which the thermal expansion coefficient from 30° C. to 400° C. was equal to or less than $11.5 \times 10^{-6}$ $(K^{-1})$, and an Al layer made of A1050 were laminated in this order was used. Here, in Examples 1 to 8, at least one of the composition of the Fe—Ni based alloy constituting the core layer and the thickness ratio (Al:Fe—Ni based alloy:Al) of the Al layer, the core layer, and the Al layer was changed.

Specifically, as shown in FIG. 13, as a test piece of Example 1, a core layer made of an Fe-36Ni alloy made of 36 mass % of Ni and the balance being Fe and inevitable impurity elements was used, and a cladding material in which Al:Fe—Ni based alloy:Al was set to 1:3:1 was used. Further, as the test piece of Example 2, the same cladding material as in Example 1 was used except that Al:Fe—Ni based alloy:Al was set to 3:1:3.

Further, as a test piece of Example 3, a core layer made of an Fe-42Ni-6Cr alloy (so-called 426 alloy) made of 42 mass % of Ni, 6 mass % of Cr, and the balance being Fe and inevitable impurity elements was used, and a cladding material in which Al:Fe—Ni based alloy:Al was set to 1:1:1 was used. Further, as the test piece of Example 4, the same cladding material as in Example 3 was used except that Al:Fe—Ni based alloy:Al was set to 2:1:2. Further, as the test piece of Example 5, the same cladding material as in Example 3 was used except that Al:Fe—Ni based alloy:Al was set to 3:1:3.

Further, as a test piece of Example 6, a core layer made of an Fe-30Ni-16Co-6Cr alloy made of 30 mass % of Ni, 16 mass % of Co, 6 mass % of Cr, and the balance being Fe and inevitable impurity elements was used, and a cladding material in which Al:Fe—Ni based alloy:Al was set to 3:1:3 was used. Further, as a test piece of Example 7, a core layer made of an Fe-34Ni-7.4Co-6Cr alloy made of 34 mass % of Ni, 7.4 mass % of Co, 6 mass % of Cr, and the balance being Fe and inevitable impurity elements was used, and a cladding material in which Al:Fe—Ni based alloy:Al was set to 3:1:3 was used. Further, as a test piece of Example 8, a core layer made of an Fe-40Ni-7.4Co-6Cr alloy made of 40 mass % of Ni, 7.4 mass % of Co, 6 mass % of Cr, and the balance being Fe and inevitable impurity elements was used, and a cladding material in which Al:Fe—Ni based alloy:Al was set to 3:1:3 was used.

On the other hand, as shown in FIG. 12, as a test piece of Comparative Example 1, an Al single plate made of A1050 (pure Al) was used. Further, as a test piece of Comparative Example 2, a single plate made of an Fe-32Ni-8Co alloy made of 32 mass % of Ni, 8 mass % of Co, and the balance being Fe and inevitable impurity elements was used. Further, as a test piece of Comparative Example 3, a single plate made of an Fe-42Ni alloy made of 42 mass % of Ni and the balance being Fe and inevitable impurity elements was used. Further, as a test piece of Comparative Example 4, a single plate made of an Fe-48Ni alloy made of 48 mass % of Ni and the balance being Fe and inevitable impurity elements was used. Further, as a test piece of Comparative Example 5, a single plate made of an Fe-48Ni-3Cr alloy made of 48 mass % of Ni, 3 mass % of Cr, and the balance being Fe and inevitable impurity elements was used. Further, as a test piece of Comparative Example 6, a single plate made of an Fe-25Cr-5Al alloy made of 25 mass % of Cr, 5 mass % of Al, and the balance being Fe and inevitable impurity elements was used.

For each test piece, the Young's modulus was measured by a general resonance method, and the thermal expansion coefficient from 30° C. to 400° C. was measured by a general TMA (Thermal Mechanical Analysis).

A paste containing $Bi_2O_3$ based powdery glass frit having a thermal expansion coefficient of $8.0 \times 10^{-6}$ $(K^{-1})$ was applied on a glass plate made of soda-lime glass in which the thermal expansion coefficient was $8.5 \times 10^{-6}$ $(K^{-1})$, and the test piece was placed on the applied paste. Thereafter, in a state in which a load of 0.2 MPa was applied to the test piece, it was held for 30 minutes under the temperature condition of 500° C. With this, by melting the powdered glass frit, the glass plate and the test piece were bonded via the fritted glass.

Thereafter, after cooling to room temperature, the cross-section of the fritted glass was observed to check whether or not there occurred cracks in the fritted glass. When the occurrence of cracks was observed, a mark x (cross mark) was allotted in FIGS. 12 and 13, and when the occurrence of cracks was not observed, ○ (circle mark) was allotted in FIGS. 12 and 13.

Note that cracks occur due to the thermal stress acting between the glass plate and the cladding material (test piece) when the fritted glass is heated and melted and then cooled to room temperature.

The peel strength (peeling strength) was also measured by a peel strength test (90 degree peel test). Specifically, as shown in FIGS. 10 and 11, a glass plate 610 made of soda-lime glass and a test piece 621 (cladding material or single plate as shown by a dotted line) were bonded approximately in parallel to the surface direction of the glass plate 610 via the fritted glass 622 made of $Bi_2O_3$ based fritted glass. Then, in a state in which the glass plate 610 was fixed to the tensile testing jig 600a, the test piece 621 was pulled in a direction perpendicular (upward, on the Z1 side) to the plane direction of the glass plate 610 (the direction parallel to the bonding surface). As a result, the stress was concentrated on the bonded end portion 600b on the pulled side among the bonding surface in the bonding region between the fritted glass 622 and the test piece 621, so that the test piece 621 was peeled off from the fritted glass 622 with the bonded end portion 600b as the peeling starting point. The peel strength (peel strength in a peel mode) was measured by measuring the maximum strength during the peeling.

The results of the first embodiment shown in FIGS. 12 and 13 were as follows: in Comparative Example 1 and Examples 2 to 8 in which the Young's modulus was 110 GPa or less, the peel strength was increased (0.5 N/mm or more); on the other hand, in Comparative Examples 2 to 6 and Example 1 in which the Young's modulus was larger than 110 GPa, the peel strength became smaller (0.1 N/mm or less). From the results of FIG. 12, in the test piece with a sufficient surface layer made of an Al, the result of the peel strength was high, and among the test pieces shown in FIG. 12, it is considered that at least Al is high in adhesion indicating the essential bonding property with the fritted glass. In Example 1, the bonding strength in the peel mode is low. This is due to the influence (Young's modulus) of the measurement method, and it is considered that the adhesion itself is high since Al is arranged at the surface layer. Furthermore, in Example 1, no occurrence of cracks due to thermal expansion has been confirmed. Therefore, the Young's modulus of the cladding material does not affect in an application requiring a bonding strength other than in a peel mode, for example, the bonding strength in a shear mode, so it is considered to be applicable even in Example 1.

In the peel strength measurement method, as shown in FIG. 10, when the Young's modulus of the test piece 621 is larger than 110 GPa (in the case where the Young's modulus is large), the test piece 621 is less likely elastically deformed. Therefore, the curvature radius r of the bent deformed portion 600c in the vicinity of the bonded end portion 600b when the test piece 621 is pulled becomes large. As a result, the distance L in the plane direction between the bonded end portion 600b (peeling portion interface) and the portion C of the test piece 621 to which a load perpendicular to the bonding surface between the fritted glass 622 and the test piece 621 is applied is increased. With this, due to the principle of leverage, since large stress (moment) is added to the bonded end portion 600b, it is considered that the test piece 621 became likely to be peeled off from the fritted glass. On the other hand, as shown in FIG. 11, when the Young's modulus of the test piece 621 is 110 GPa or less (when the Young's modulus is small), the test piece 621 is easily elastically deformed. Therefore, the radius of curvature r of the bent deformed portion 600c when the test piece 621 is pulled is reduced. As a result, the distance L in the plane direction between the bonded end portion 600b and the portion C of the test piece 621 becomes short. With this, due to the principle of leverage, since large stress (moment) was not applied to the bonded end portion 600b, it is considered that the test piece 621 was less likely to be peeled off from the fritted glass 622. Further, in Comparative Examples 2 to 5, it is considered that the peel strength was reduced also by bonding the Al-free alloy having high adhesion to the glass and the fritted glass.

Here, as a method of measuring the bonding strength between a metal material (a cladding material and a metal single plate) and fritted glass, when the measurement is performed in a peel mode (a mode in which a metal material is peeled off from the fritted glass from the bonded end portion of among bonding surfaces as a peeling starting point), it is required to consider that the stress generated at the peeling portion interface differs not only by the adhesion indicating the essential bonding performance between the metallic material and the fritted glass but also by the magnitude of the radius of curvature r (see FIGS. 10 and 11) of the bent deformed portion 600c caused when pulling the metal material upward from one end of the bonding surface. Therefore, when the adhesive property indicating the substantial bonding property is the same, the metal material small in radius of curvature r and small in Young's modulus at the peeling portion interface becomes higher in peel strength, which is considered to be preferable as a reinforcing member (glass bonding material).

In Comparative Example 1 and Examples 2, 4 to 8 in which the Young's modulus of the test piece was 100 GPa or less, the peel strength was further increased (1.2 N/mm or more), and in Comparative Example 1, Examples 2, 5 to 8 in which the Young's modulus of the test piece was 90 GPa or less, the peel strength was further increased (1.8 N/mm or more). With this, it turned out that it is possible to make it difficult to be peeled off from the fritted glass by reducing the Young's modulus of the test piece to increase the peel strength.

In Comparative Examples 4 and 5 and Example 1 to 8 in which the thermal expansion coefficient $X \times 10^{-6}$ ($K^{-1}$) of the test piece satisfied the relationship of 7.5×11.5, the occurrence of cracks was not observed. On the other hand, in Comparative Examples 1 to 3 and 6 in which the thermal expansion coefficient $X \times 10^{-6}$ ($K^{-1}$) of the test piece did not satisfy the relationship of 7.5×11.5, the occurrence of cracks was observed. This is due to the fact that when heated to 500° C. and then cooled to room temperature, although thermal stress due to the difference in the degree of heat shrinkage occurs in the fritted glass arranged between the glass plate made of soda-lime glass in which the thermal expansion coefficient was $8.5 \times 10^{-6}$ ($K^{-1}$) and the test piece, at this time, when the thermal expansion coefficient $X \times 10^{-6}$ ($K^{-1}$) of the test piece satisfied the relationship of 7.5×11.5, only thermal stress which can be resisted by the fritted glass occurred. Therefore, it is considered that no occurrence of cracks was observed in the fritted glass. On the other hand, when the thermal expansion coefficient $X \times 10^{-6}$ ($K^{-1}$) of the test piece did not satisfy the relationship of $7.5 \leq x \leq 11.5$, it is considered that the occurrence of cracks was observed in the fritted glass as a thermal stress occurred to the extent that the fritted glass could not resist.

As a result, it is considered that all of Examples 1 to 8 in which the occurrence of cracks was not observed are suitable as a cladding material for a reinforcing member (glass bonding material) to be bonded to a glass plate made of soda-lime glass in which the thermal expansion coefficient is $8.5 \times 10^{-6}$ ($K^{-1}$) via $Bi_2O_3$ based fritted glass in which the thermal expansion coefficient is $8.0 \times 10^{-6}$ ($K^{-1}$). Further, it is considered that Examples 2 to 8 in which the occurrence of cracks was not observed and the peel strength was large is more suitable as a cladding material used for a reinforcing member (glass bonding material). Further, it is considered that Examples 2 and 4 to 8 in which the occurrence of cracks was not observed and the peel strength was large is further more suitable as a cladding material used for a reinforcing member (glass bonding material).

Further, from the results of Examples 1 and 2, in the case where the core layer was made of an Fe-36Ni alloy, when the thickness of the core layer was small (Example 2), compared with the case in which the thickness of the core layer was large (Example 1), the Young's modulus was small and the peel strength was large. In the same manner, also from the results of Examples 3 to 5, in the case in which the core layer was made of an Fe-42Ni-6Cr alloy, when the thickness of the core layer was small (Examples 4 and 5), compared with the case in which the thickness of the core layer was large (Example 3), the Young's modulus was small and the peel strength was large. From these results, it was turned out that the Young's modulus can be decreased and the peel strength can be increased by decreasing the thickness of the core layer and increasing the thickness of the Al layer.

Second Example

Next, with reference to FIGS. 6, 10 and 14, a second example carried out to confirm the effects of the present invention will be described.

In the second Example, assuming that the cladding material 301 shown in FIG. 6 is used for the glass bonding material, a plurality of overlay type cladding materials (see FIG. 6) of a two-layer structure different in thicknesses were prepared. For each cladding material (test piece), the peel strength was measured when the cladding material (test piece) was bonded to a glass plate made of soda-lime glass via fritted glass. Also in the second Example, the thickness t1 (see FIG. 10) of the test piece was set to 100 μm, and before the test, the internal stress, etc., were removed by annealing each test piece at an appropriate temperature.

Here, as a test piece of Examples 11 to 13 of the second Example, as shown in FIG. 14, a cladding material of a two-layer structure in which an Al layer made of A1050 (pure Al) and an Fe-30Ni-16Co-6Cr alloy made of 30 mass % of Ni, 16 mass % of Co, 6 mass % of Cr, and the balance being Fe and inevitable impurity elements (the thermal expansion coefficient from 30° C. to 400° C. was equal to or less than $11.5 \times 10^{-6}$ ($K^{-1}$)) were laminated was used. Here, in Examples 11 to 13, the thickness ratio (Al: Fe—Ni based alloy) of the Al layer and the core layer was changed. The thermal expansion coefficient from 30° C. to 400° C. of Fe-30Ni-16Co-6Cr alloy was $8.4 \times 10^{-6}$ ($K^{-1}$).

Specifically, as the test piece of Example 11, a cladding material in which Al:Fe—Ni based alloy was set to 1:1 was used. Further, as the test piece of Example 12, a cladding material in which Al:Fe—Ni based alloy was set to 3:1 was used. Further, as the test piece of Example 13, a cladding material in which Al:Fe—Ni based alloy was set to 6:1 was used.

On the other hand, as a test piece of Comparative Example 1a, an Al single plate made of A1050 was used.

Then, a paste containing $Bi_2O_3$ based powdery glass frit having a thermal expansion coefficient of $8.0 \times 10^{-6}$ ($K^{-1}$) was applied on a glass plate made of soda-lime glass in which the thermal expansion coefficient was $8.5 \times 10^{-6}$ ($K^{-1}$), and the test piece was placed on the applied paste. Thereafter, in a state in which a load of 0.2 MPa was applied to the test piece, it was held for 30 minutes under the temperature condition of 500° C. With this, by melting the powdered glass frit, the glass plate and the test piece were bonded via the fritted glass. Thereafter, after cooling to room temperature, the peel strength was measured by the peel strength test described above (90 degree peel test, see FIG. 10).

The result of the second example shown in FIG. 14 was that in Example 13 in which the thickness ratio was 6:1, the peel strength became larger (2.7 N/mm) than the peel strength (1.8 N/mm) of the Al single plate of Comparative Example 1a. From the result, it was turned out that the peel strength can be increased than the Al single plate of Comparative Example 1a by sufficiently decreasing the thickness of the core layer and sufficiently increasing the thickness of the Al layer.

Third Example

Next, with reference to FIGS. 6, 10, and 15, a third example carried out to confirm the effects of the present invention will be described.

In the third example, different from the aforementioned second example, a plurality of overlay type cladding materials (see FIG. 6) of a two-layer structure different in Al-based alloy composition were prepared. For each cladding material (test piece), the peel strength when bonding the cladding material (test piece) to a glass plate made of soda-lime glass via fritted glass was measured. Also in the third example, the thickness t1 (see FIG. 10) of the test piece was set to 100 μm, and before the test, the internal stress, etc., were removed by annealing each test piece at an appropriate temperature.

Here, as a test piece of Examples 21 to 24 of the third Example, as shown in FIG. 15, a cladding material of a two-layer structure in which an Al layer made of an Al-based alloy different in composition and a core layer made of an Fe-30Ni-16Co-6Cr alloy made of 30 mass % of Ni, 16 mass % of Co, 6 mass % of Cr, and the balance being Fe and inevitable impurity elements (the thermal expansion coefficient: $8.4 \times 10^{-6}$ ($K^{-1}$)) were laminated was used. Further, in Examples 21 to 24, the thickness ratio (Al-based alloy:Fe—Ni based alloy) of the Al layer and the core layer was set to 6:1.

Specifically, as the Al-based alloy constituting the Al layer of the test piece of Example 21, a high purity Al containing 99.9 mass % or more of Al was used. Further, as the Al-based alloy constituting the Al layer of the test piece of Example 22, A1050 containing 0.25 mass % or less of Si, 0.40 mass % or less of Fe, 0.05 mass % or less of Cu, 0.05 mass % or less of Mn, 0.05 mass % or less of Mg, 0.05 mass % or less of Zn, and 99.5 mass % or more of Al in which the sum of Si, Fe, Cu, Mn, Mg and Zn is less than 0.5 mass % was used.

Further, as the Al-based alloy constituting the Al layer of the test piece of Example 23, A5052 containing 0.25 mass % or less of Si, 0.40 mass % or less of Fe, 0.10 mass % or less of Cu, 0.10 mass % or less of Mn, 2.2 mass % or more and 2.8 mass % or less of Mg, 0.15 mass % or more and 0.35 mass % or less of Cr, 0.10 mass % or less of Zn, and the balance being Al was used. Further, as the Al-based alloy constituting the Al layer of the test piece of Example 24, an Al-based alloy corresponding to A4047 containing 12 mass % of Si was used. Note that the exact content of the inevitable impurity elements and that of the balance Al in the Al-based alloy of Example 24 were not measured. Here, the Al-based alloy constituting the Al layer of the test piece of Examples 23 and 24, an Al of 99.0 mass % or more was not contained.

In the same manner as in the aforementioned second example, by melting the fritted glass, the glass plate and the test piece were bonded via the fritted glass. Thereafter, after cooling to room temperature, the peel strength was measured by the peel strength test described above (90 degree peel test, see FIG. 10).

The result of the third example shown in FIG. 15 was that in Examples 21 and 22 containing 99.0 mass % (99.5 mass %) or more of Al, compared with Examples 23 and 24 not containing 99.0 mass % or more of Al, the peel strength became larger. From this result, it turned out that in the Al-based alloy constituting the Al layer to be bonded to the fritted glass, by decreasing the content rate of impurities by increasing the content ratio of Al, the adhesion between the fritted glass and the Al layer was improved and the peel strength could be improved. Further, from the results of Examples 23 and 24, it was also turned out that an Al—Si alloy such as A4047 is more suitable for bonding with fritted glass than an Al—Mg alloy such as A5052.

Reference Example

Next, with reference to FIG. 16, a corrosion resistance test of an Fe—Ni based alloy having a thermal expansion coefficient from 30° C. to 400° C. of 11.5×10$^{-6}$ (K$^{-1}$) or less and used as a core layer will be described.

In Reference Examples 1 to 8, plate materials made of an Fe—Ni based alloy different in composition were prepared. Specifically, as a plate member of Reference Example 1, a plate member made of an Fe-48Ni alloy made of 48 mass % of Ni and the balance being Fe and inevitable impurity elements was used. Further, as a plate member of Reference Example 2, a plate member made of an Fe-48Ni-2Cr alloy made of 48 mass % of Ni, 2 mass % of Cr, and the balance being Fe and inevitable impurity elements was used. Further, as a plate member of Reference Example 3, a plate member made of an Fe-48Ni-4Cr alloy made of 48 mass % of Ni, 4 mass % of Cr, and the balance being Fe and inevitable impurity elements was used. Further, as a plate member of Reference Example 4, a plate member made of an Fe-48Ni-6Cr alloy made of 48 mass % of Ni, 6 mass % of Cr, and the balance being Fe and inevitable impurity elements was used. Further, as a plate member of Reference Example 5, a plate member made of an Fe-30Ni-16Co alloy made of 30 mass % of Ni, 16 mass % of Co, and the balance being Fe and inevitable impurity elements was used. Further, as a plate member of Reference Example 6, a plate member made of an Fe-30Ni-16Co-2Cr alloy made of 30 mass % of Ni, 16 mass % of Co, 2 mass % of Cr, and the balance being Fe and inevitable impurity elements was used. Further, as a plate member of Reference Example 7, a plate member made of an Fe-30Ni-16Co-4Cr alloy made of 30 mass % of Ni, 16 mass % of Co, 4 mass % of Cr, and the balance being Fe and inevitable impurity elements was used. Further, as a plate member of Reference Example 8, a plate member made of an Fe-30Ni-16Co-6Cr alloy made of 30 mass % of Ni, 16 mass % of Co, 6 mass % of Cr, and the balance being Fe and inevitable impurity elements was used.

On the other hand, as a plate member of Comparative Example 1b, an Al single plate made of A1050 was used.

Then, a salt spray test in accordance with JIS Z2371 was conducted. Specifically, under the temperature condition of (35±2)° C., saltwater in which the salt (sodium chloride) concentration was (50±5) g/L was sprayed on each plate material. Then, the corrosion degree (rusting condition) of the plate material surface was observed at each of 12 hours (12 h), 24 hours (24 h) and 48 hours (48 h) from the start of spraying. Here, in FIG. 16, when approximately no corrosion was observed, a circle (circle) is allotted. In addition, when although corrosion was observed somewhat, it was of such a degree that no problem occurred even when used, Δ (triangle mark) was allotted. Further, when corrosion was observed to a certain extent that a problem could occur when used, x (cross) was allotted.

The results of the reference example shown in FIG. 16 were that in Reference Examples 1, 2, 5, and 6 containing 2 mass % or less of Cr, corrosion was confirmed at 12 h and obvious corrosion was observed at 24 h. Further, in Reference Examples 3 and 7 containing 2 mass % or more and 4 mass % or less of Cr, corrosion was confirmed at 24 h and obvious corrosion was observed at 48 h. On the other hand, in Reference Examples 4 and 8 containing 4 mass % or more of Cr, in the same manner as in Comparative Example 1b, corrosion was confirmed at 48 h but it was at a no-problem level. Therefore, it was turned out that as a glass bonding material to be arranged in a portion requiring corrosion resistance, it is preferable to use a core layer made of an Fe—Ni based alloy containing 4 mass % or more of Cr, and that it is more preferable to use a core layer made of an Fe—Ni based alloy containing 6 mass& or more of Cr. In the case of using an Fe—Ni based alloy having a small content of Cr as the core layer as in the case of containing 2 mass % or less of Cr, by applying corrosion resistance plating to the exposed portion of the core layer, it is also possible to suppress corrosion of the core layer.

Therefore, from the aforementioned first to third Examples, from the viewpoint of suppressing the occurrence of cracks or breakages, the magnitude of peel strength, and the high corrosion resistance, at present, it is considered that a cladding material of a two-layer structure in which an Al layer made of A1050 (pure Al) used in Example 13 and a core layer made of an Fe-30Ni-16Co-6Cr alloy are laminated and Al:Fe—Ni based alloy is set to 6:1 is most suitable as a material used for a reinforcing member (glass bonding material) for bonding an Al layer and soda-lime glass via Bi$_2$O$_3$ based fritted glass.

Further, from the viewpoint of suppressing the occurrence of cracks or breakages, the magnitude of peel strength, and the high corrosion resistance, it is considered that a cladding material of a three-layer structure in which an Al layer made of A1050 (pure Al) used in Example 5 to 8, a core layer made of an Fe-(30 to 42)Ni-(0 to 16)Co-6Cr alloy, and an Al layer made of A1050 are laminated and Al:Fe—Ni based alloy:Al is set to 3:1:3 is rather suitable as a material used for a reinforcing member (glass bonding material) for bonding an Al layer and soda-lime glass via Bi$_2$O$_3$ based fritted glass. In the same manner, it is considered that a cladding material of a two-layer structure in which an Al layer made of A1050 (pure Al) used in Example 12 and a core layer made of an Fe-30Ni-16Co-6Cr alloy are laminated and Al:Fe—Ni based alloy is set to 3:1 is also rather suitable as a material used for a reinforcing member (glass bonding material) for bonding an Al layer and soda-lime glass.

Further, from the viewpoint of suppressing the occurrence of cracks or breakages and the magnitude of peel strength, except of the viewpoint of the corrosion resistance, it is considered that a cladding material of a three-layer structure in which an Al layer made of A1050 (pure Al) used in Example 2, a core layer made of an Fe-36Ni alloy, and an Al layer made of A1050 are laminated and Al:Fe—Ni based alloy:Al is set to 3:1:3 is rather suitable as a material used for a reinforcing member (glass bonding material) for bonding an Al layer and soda-lime glass via $Bi_2O_3$ based fritted glass.

Furthermore, it is considered that it is more suitable as a cladding material used for a reinforcing member (glass bonding material) by configuring an Al layer by high purity Al (content rate of 99.9 mass % or more of Al) instead of A1050.

It should be understood that the embodiments and examples disclosed here are examples in all respects and are not restrictive. The scope of the present invention is shown by claims rather than the descriptions of the embodiments and the examples described above, and covers all changes (modifications) within the meaning of equivalence and claims.

For example, in the first and second embodiments and the modifications described above, examples in which the reinforcing members (glass bonding materials) of the present invention are used for the sealing part A(B) of the vacuum multilayer glass 100(400) are exemplified, but the present invention is not limited to them. In the present invention, the glass bonding material of the present invention may be used for parts other than the sealing part of the vacuum multilayer glass, and the glass bonding material of the present invention may be used for portions requiring bonding by glass other than vacuum multilayer glass. For example, the glass bonding material of the present invention may be used for parts of the vacuum multilayer glass other than the sealing part such as the discharge port, and the glass bonding material of the present invention may be used for the sealing part of the display which requires bonding by glass. Even in cases where the glass bonding material of the present invention is used for the aforementioned applications, since the bonding between the Al-based alloy constituting the first layer and glass is favorable, it is possible to suppress peeling of the glass bonding material from the glass.

Further, in the first and second embodiments and the modified examples, examples are shown in which the Al layer of the cladding material and the glass plate made of soda-lime glass are bonded via fritted glass, but not limited to them. In the present invention, the member to be bonded via fritted glass may be a glass member other than soda-lime glass. For example, a non-alkali glass (thermal expansion coefficient: about $3.8 \times 10^{-6}$ ($K^{-1}$)) produced using materials such as silica sand ($SiO_2$), alumina ($Al_2O_3$), boron oxide ($B_2O_3$), etc., may be used. Further, the member to be connected via the fritted glass may be a member other than glass such as a Si substrate. In these cases, it is preferable that the thermal expansion coefficient $X \times 10^{-6}$ ($K^{-1}$) from 30° C. to 400° C. of the cladding material having an Al layer satisfy the relationship of $(X2-1) \leq X \leq (X2+3)$ with respect to the thermal expansion coefficient $X2 \times 10^{-6}$ ($K^{-1}$) from 30° C. to 400° C. via the fritted glass since the occurrence of cracks, breakages, etc., in the fritted glass can be suppressed.

Further, in the first and second embodiments and the modified examples, examples are shown in which the Al layer of the cladding material and the glass plate are bonded via fritted glass made of fritted $Bi_2O_3$ based glass, but the present invention is not limited to them. In the present invention, the fritted glass for bonding the Al layer and the glass plate may be fritted glass other than $Bi_2O_3$ based glass such as B(boron) based or V(vanadium) based fritted glass. At this time, the fritted glass is preferably fritted glass having a thermal expansion coefficient close to the thermal expansion coefficient of the glass plate and the thermal expansion coefficient of the cladding material having the Al layer. Further, the Al layer of the cladding material constituting the glass bonding material and the Al layer constituting the cladding material may be bonded via glass other than fritted glass.

In the first and second embodiments and the modifications, examples in which the peel strength is considered are shown, but the present invention is not limited thereto. In the present invention, the configuration of the glass bonding material may be taken into consideration based on parameters other than peel strength, depending on the position where the sealing member is arranged. For example, based on the shear strength, the configuration of the glass bonding material may be considered. At this time, even in the case of a cladding material in which the Young's modulus is greater than about 110 Ga or a cladding material in which the thermal expansion coefficient is less than about $7.5 \times 10^{-6}$ ($K^{-1}$) or greater than about $11.5 \times 10^{-6}$ ($K^{-1}$), it is considered that there is enough possibility that it can be suitably used as a glass bonding material.

Further, in the first and second embodiments and the modifications, examples in which the Young's modulus of the reinforcing member (glass bonding material) is about 110 GPa or less are shown, but the present invention is not limited thereto. In the present invention, in cases where the thermal stress generated when bonding the glass plate and the glass bonding material via the fritted glass is small, or the peel mode stress is not applied to the bonded portion between the glass plate and the glass bonding material, the Young's modulus of the glass bonding material may be larger than 110 GPa.

Further, in the first and second embodiments, and modified examples, examples in which the thermal expansion coefficient $X \times 10^{-6}$ ($K^{-1}$) from 30° C. to 400° C. of the reinforcing member is configured to satisfy the relationship of about $7.5 \leq X \leq 11.5$ are shown, but the present invention is not limited to that. In the present invention, when the thermal stress generated when bonding the fritted glass is small, etc., it is not required that the thermal expansion coefficient $X \times 10^{-6}$ ($K^{-1}$) from 30° C. to 400° C. of the reinforcing member satisfies the relationship of about $7.5 \leq X \leq 11.5$.

Although an example in which the reinforcing member 121 made of the cladding material 101 according to the first modification of the first embodiment is replaced with a reinforcing member 21 made of the cladding material 1 of the vacuum multilayer glass 100 of the first embodiment shown in FIGS. 1 and 2 is shown, the present invention is not limited to this. In the present invention, the reinforcing member 121 made of the cladding material 101 of the first modification of the first embodiment may be applied in place of the reinforcing member 421 made of the cladding material 401 of the vacuum multilayer glass 400 of the second embodiment shown in FIG. 7.

Further, in the first embodiment, an example in which the Al layer 11 (first layer) and the Al layer 13 (third layer) are constituted by the same Al-based alloy and have approximately the same thickness, however, the present invention is not limited thereto. In the present invention, the first layer and the third layer may be made of Al-based alloys different from each other, or the thickness of the first layer and the thickness of the third layer may be different from each other.

Further, in the first embodiment, an example in which the Young's modulus of the Al-based alloy constituting the Al layers 11 and 13 is set to be smaller than the Young's modulus of the Fe—Ni based alloy constituting the core layer 12 and the thickness t2 of the Al layers 11 and 13 is set to be equal to or larger than the thickness t3 of the core layer 12, but the present invention is not limited thereto. In the present invention, the Young's modulus of the Al-based alloy constituting the Al layer may be equal to or larger than the Young's modulus of the Fe—Ni based alloy constituting the core layer. Further, the thickness of the Al layer may be less than the thickness of the core layer.

Further, in the first and second embodiments and modified examples, examples in which the thermal expansion coefficient $X1 \times 10^{-6}$ ($K^{-1}$) from 30° C. to 400° C. of the Fe—Ni based alloy constituting the core layer satisfies the relationship of about $7.5 \leq X \leq 11.5$ are shown, but the present invention is not limited to this. In the present invention, it is preferable to use an Fe—Ni based alloy having a thermal expansion coefficient close to the thermal expansion coefficient value of the glass to be bonded such as fritted glass which is actually used. As a result, there occurs that the thermal expansion coefficient X1 of the Fe—Ni based alloy is preferably less than about 7.5, depending on the type of glass to be bonded.

What is claimed is:

1. A glass bonding material for bonding glass plates to each other;
    the glass bonding material comprising a fritted glass and a cladding material;
    wherein the cladding material comprises at least a first layer made of an Al-based alloy bonded to a second layer made of an Fe—Ni based alloy having a thermal expansion coefficient from 30° C. to 400° C. of $11.5 \times 10^{-6}$ ($K^{-1}$) or less,
    wherein the first layer has a region that is capable of being bonded to the glass plates via the fritted glass, and
    wherein the thickness of the first layer is twice or more the thickness of the second layer.

2. The glass bonding material according to claim 1, wherein a Young's modulus of the cladding material is 110 GPa or less.

3. The glass bonding material according to claim 1, wherein the glass plates are made of soda-lime glass, and
    a thermal expansion coefficient $X \times 10^{-6}$ ($K^{-1}$) from 30° C. to 400° C. of the cladding material satisfies a relationship of $7.5 \leq X \leq 11.5$.

4. The glass bonding material according to claim 1, wherein
    a Young's modulus of the first layer made of the Al-based alloy is smaller than a Young's modulus of the second layer made of the Fe—Ni based alloy.

5. The glass bonding material according to claim 1, wherein the second layer made of the Fe—Ni based alloy is arranged at a position opposed to a region where the first layer and the fritted glass are bonded in a thickness direction of the cladding material.

6. The glass bonding material according to claim 1, wherein the cladding material is made of an overlay type cladding material of a three-layer structure in which the first layer, the second layer, and a third layer are bonded, the third layer being made of an Al-based alloy and bonded to a surface of the second layer opposite to a surface to which the first layer is bonded.

7. The glass bonding material according to claim 6, wherein the first layer and the third layer have approximately the same thickness.

8. The glass bonding material according to claim 1, wherein the Fe—Ni based alloy constituting the second layer comprises 28 mass % or more and 50 mass % or less of Ni, 0 mass % or more and 20 mass % or less of Co, 0 mass % or more and 8 mass % or less of Cr, and the balance being Fe and inevitable impurity elements.

9. The glass bonding material according to claim 8, wherein the Fe—Ni based alloy constituting the second layer contains 4 mass % or more and 8 mass % or less of Cr.

10. The glass bonding material according to claim 1, wherein the Al based alloy constituting the first layer contains 99.0 mass % or more of Al.

11. The glass bonding material according to claim 1, wherein the glass bonding material is used for a sealing part of a vacuum multilayer glass.

12. The glass bonding material according to claim 2, wherein a Young's modulus of the cladding material is 85 GPa or more and 100 GPa or less.

13. The glass bonding material according to claim 1, wherein the second layer is not arranged at a position facing a region where the first layer and the fritted glass are not bonded but is arranged at a position opposed to a region where the first layer and the fritted glass are bonded.

14. The glass bonding material according to claim 13, wherein the first layer is arranged both in the region where the first layer and the fritted glass are bonded and in the region where the first layer and the fritted glass are not bonded.

15. The glass bonding material according to claim 1, wherein a Young's modulus of the first layer made of the Al-based alloy is smaller than a Young's modulus of the second layer made of the Fe—Ni based alloy, and
    the second layer is arranged on a surface opposite to a region where the first layer and the fritted glass are bonded at a position facing the region where the first layer and the fritted glass are bonded.

16. The glass bonding material according to claim 1, wherein
    the fritted glass includes a first fritted glass and a second fritted glass,
    the glass plates include a first glass plate and a second glass plate,
    the cladding material includes a first parallel part provided in a region where the first layer and the first fritted glass are bonded and extending approximately parallel to a first bonding surface of the first glass plate to which the first fritted glass is bonded,
    a second parallel part provided in a region where the first layer and the second fritted glass are bonded and extending approximately parallel to a second bonding surface of the second glass plate to which the second fritted glass is bonded, and
    an inclined portion extending in an inclined state with respect to the first bonding surface and the second bonding surface so as to connect the first parallel part and the second parallel part.

17. A multilayer glass in which a plurality of glass plates are arranged with a gap therebetween and a periphery of the plurality of glass plates is bonded by a sealing part, wherein
    the sealing part includes the glass bonding material according to claim 1.

18. The multilayer glass according to claim 17, wherein the gap is lowered in pressure.

\* \* \* \* \*